US012724188B2

(12) United States Patent
Le et al.

(10) Patent No.: US 12,724,188 B2
(45) Date of Patent: Sep. 1, 2026

(54) OPTICAL FILM AND OPTICAL SYSTEM

(71) Applicant: 3M INNOVATIVE PROPERTIES COMPANY, St. Paul, MN (US)

(72) Inventors: John D. Le, Woodbury, MN (US); Timothy L. Wong, West St. Paul, MN (US); Benjamin G. Sonnek, Mahtomedi, MN (US); Kayla A. McGrath, Cottage Grove, MN (US); David J.W. Aastuen, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 253 days.

(21) Appl. No.: 18/282,859

(22) PCT Filed: Mar. 10, 2022

(86) PCT No.: PCT/IB2022/052174
§ 371 (c)(1),
(2) Date: Sep. 19, 2023

(87) PCT Pub. No.: WO2022/200904
PCT Pub. Date: Sep. 29, 2022

(65) Prior Publication Data

US 2024/0168210 A1 May 23, 2024

Related U.S. Application Data

(60) Provisional application No. 63/200,760, filed on Mar. 26, 2021.

(51) Int. Cl.
*G02B 5/30* (2006.01)

(52) U.S. Cl.
CPC .................................. *G02B 5/3041* (2013.01)

(58) Field of Classification Search
CPC ....... G02B 5/3041; G02B 5/305; G02B 27/28
See application file for complete search history.

(56) References Cited

U.S. PATENT DOCUMENTS 6,480,338 B1 11/2002 Ohzawa
7,104,776 B2 9/2006 Merrill et al.
(Continued)

FOREIGN PATENT DOCUMENTS

WO 2018163009 A1 9/2018
WO 2020051874 A1 3/2020
WO 2020115679 A2 6/2020

OTHER PUBLICATIONS

International Search report for PCT International Application No. PCT/IB2022/052174, mailed on Jun. 17, 2022, 3 pages.

*Primary Examiner* — Angela M. Medich

(57) ABSTRACT

An optical film includes a first optical stack disposed on a visible light absorbing second optical stack. Each of the first and second optical stacks includes a plurality of alternating polymeric first and second layers. The first layers have a higher index of refraction than the second layers at least along an in-plane same first direction. For substantially normally incident light and for at least 80% of wavelengths in a visible wavelength range, the plurality of alternating polymeric first and second layers for at least the first optical stack reflects more than about 60% of the incident light polarized along the first direction and transmits more than about 45% of the incident light polarized along an in-plane orthogonal second direction, and at least the first layers of the second optical stack are more light absorbing for the incident light polarized along the first direction than the second direction.

4 Claims, 11 Drawing Sheets

(56) References Cited

U.S. PATENT DOCUMENTS

| | | | | |
|---|---|---|---|---|
| 7,242,524 | B2 | 7/2007 | Dike | |
| 2004/0014504 | A1 | 1/2004 | Coates et al. | |
| 2004/0051947 | A1 | 3/2004 | Kagawa | |
| 2007/0047080 | A1 | 3/2007 | Stover et al. | |
| 2009/0047522 | A1 | 2/2009 | Yu | |
| 2012/0062846 | A1 | 3/2012 | Dike | |
| 2012/0293742 | A1 * | 11/2012 | Banerjee .............. | G02B 5/3041 362/19 |
| 2013/0202867 | A1 | 8/2013 | Coggio et al. | |
| 2016/0085102 | A1 | 3/2016 | Ohmuro et al. | |
| 2017/0017077 | A1 | 1/2017 | Tang et al. | |
| 2020/0319388 | A1 | 10/2020 | Ambur et al. | |
| 2020/0319389 | A1 | 10/2020 | Yun et al. | |

* cited by examiner

OPTICAL FILM AND OPTICAL SYSTEM

CROSS REFERENCE TO RELATED APPLICATIONS

This application is a national stage filing under 35 U.S.C. 371 of PCT/IB2022/052174, filed Mar. 10, 2022, which claims the benefit of U.S. Provisional Application No. 63/200,760, filed Mar. 26, 2021, the disclosures of which are incorporated by reference in their entireties herein.

TECHNICAL FIELD

The present disclosure relates, in general, to an optical film. In particular, the present disclosure relates to an optical film for an optical system.

BACKGROUND

Polarizers are optical elements that allow incident light of one polarization to be transmitted through the polarizer, while blocking light of another polarization. In some cases, multi-function polarizers are constructed from layers of laminates. Conventionally, the different layers of laminates of such multi-function polarizers are laminated to each other using optical adhesives.

SUMMARY

In a first aspect, the present disclosure provides an optical film. The optical film includes a first optical stack disposed on, and spaced apart by one or more spacer layers from, a visible light absorbing second optical stack. Each of the first and second optical stacks includes a plurality of polymeric layers. Each of the polymeric layers has an average thickness of less than about 500 nanometres (nm). For an incident light propagating in an incident plane including a second direction, for each wavelength in a visible wavelength range extending from about 420 nm to about 680 nm, for substantially normal incidence, and for the incident light incident from a first optical stack side of the optical film, the optical film reflects more than about 60% of the incident light when the incident light is s-polarized and transmits more than about 45% of the incident light when the incident light is p-polarized. For the incident light propagating in the incident plane including the second direction, for each wavelength in the visible wavelength range, for substantially normal incidence, and for the incident light incident from a light absorbing second optical stack side of the optical film, the optical film reflects less than about 30% of the incident light when the incident light is s-polarized and transmits more than about 50% of the incident light when the incident light is p-polarized.

In a second aspect, the present disclosure provides an optical film. The optical film includes a first optical stack disposed on, and spaced apart by one or more spacer layers from, a visible light absorbing second optical stack. Each of the first and second optical stacks includes a plurality of polymeric layers. Each of the polymeric layers has an average thickness of less than about 500 nm. For a substantially normally incident light, for each wavelength in a visible wavelength range extending from about 420 nm to about 680 nm and divided into a shorter wavelength interval at least 50 nm wide and a remaining longer wavelength interval at least 40 nm wide, for the incident light incident from a first optical stack side of the optical film, and for each wavelength in the shorter wavelength interval, the optical film reflects more than about 60% of the incident light when polarized along a first direction and transmits more than about 50% of the incident light when polarized along an orthogonal second direction. For the substantially normally incident light, for the incident light incident from the first optical stack side of the optical film, and for at least one wavelength in the remaining longer wavelength interval, the optical film absorbs more than about 40% of the incident light when polarized along the first direction and absorbs less than about 30% of the incident light when polarized along the second direction. For the substantially normally incident light, for the incident light incident from a light absorbing second optical stack side of the optical film, and for the visible wavelength range, the optical film has an average optical reflectance of less than about 40% when the incident light is polarized along the first direction and an average optical transmittance of more than about 50% when the incident light is polarized along the second direction.

In a third aspect, the present disclosure provides an optical film. The optical film includes a first optical stack disposed on a second optical stack. Each of the first and second optical stacks includes a plurality of alternating polymeric first and second layers numbering at least 50 in total. Each of the polymeric first and second layers has an average thickness of less than about 500 nm. For each of the first and second optical stacks, the first layers have a higher index of refraction than the second layers at least along an in-plane same first direction. For substantially normally incident light and for at least 80% of wavelengths in a visible wavelength range extending from about 420 nm to about 680 nm, the plurality of alternating polymeric first and second layers for at least the first optical stack reflects more than about 60% of the incident light polarized along the first direction and transmits more than about 45% of the incident light polarized along an in-plane orthogonal second direction. For substantially normally incident light and for at least 80% of wavelengths in a visible wavelength range extending from about 420 nm to about 680 nm, at least the first layers of the second optical stack are more light absorbing for the incident light polarized along the first direction than the second direction.

BRIEF DESCRIPTION OF DRAWINGS

Exemplary embodiments disclosed herein is more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labelled with the same number.

DETAILED DESCRIPTION

Figure 1:
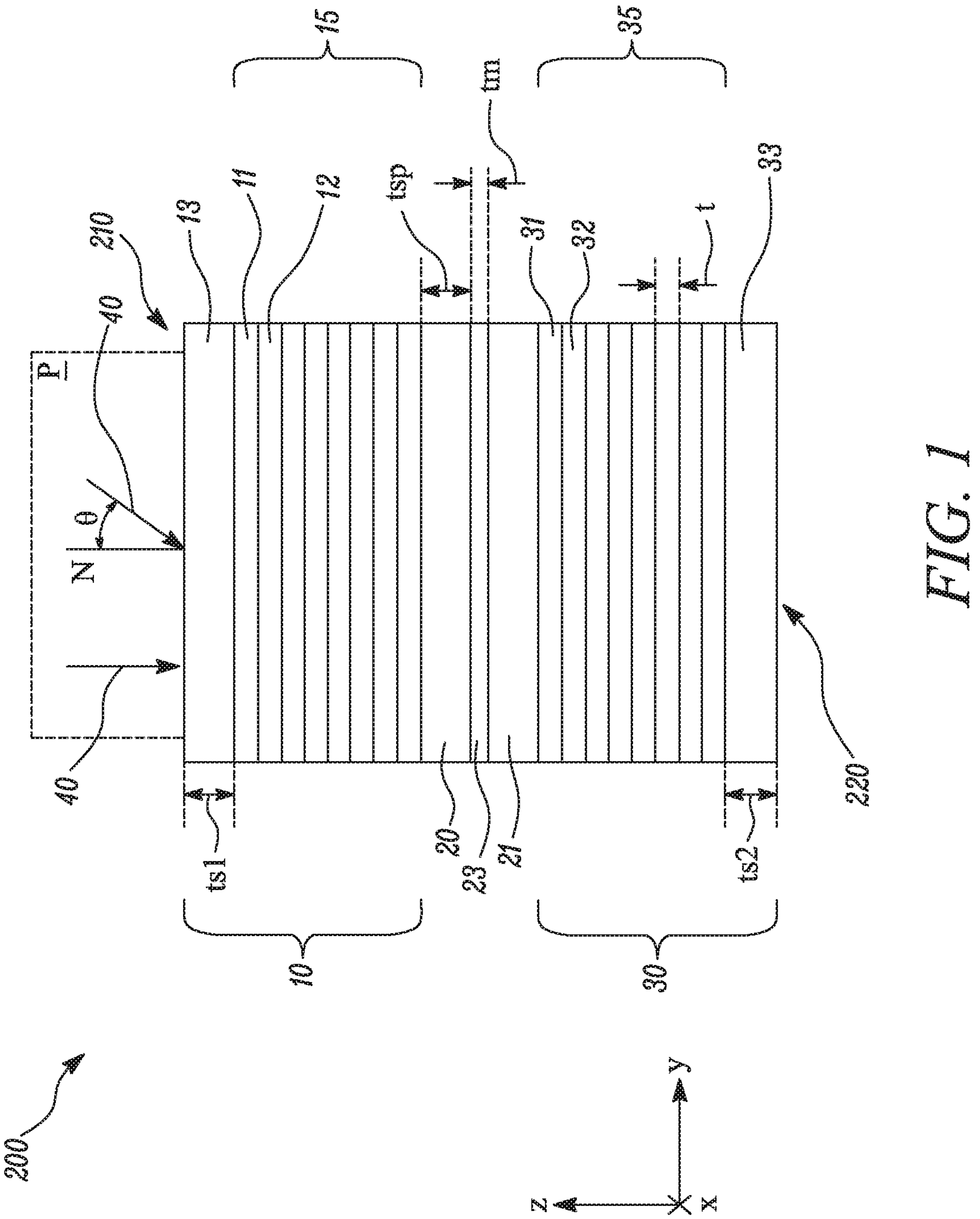
FIG. 1 is a schematic sectional view of an optical film, in accordance with an embodiment of the present disclosure.

In the following description, reference is made to the accompanying figures that form a part thereof and in which various embodiments are shown by way of illustration. It is to be understood that other embodiments are contemplated and is made without departing from the scope or spirit of the present disclosure. The following detailed description, therefore, is not to be taken in a limiting sense.

The present disclosure relates to an optical film. The optical film is used in an optical system, such as in displays of electronic devices. Examples of such electronic devices include computer monitors, televisions, mobile phones, personal digital assistants (PDAs), wearable devices and other portable devices. In some other exemplary implementations, the optical film is used in augmented reality (AR) and virtual reality (VR) devices.

The optical film includes a first optical stack disposed on, and spaced apart by one or more spacer layers from, a visible light absorbing second optical stack. Each of the first and second optical stacks includes a plurality of polymeric layers. Each of the polymeric layers has an average thickness of less than about 500 nanometres (inn). For an incident light propagating in an incident plane including a second direction, for each wavelength in a visible wavelength range extending from about 420 nm to about 680 nm, for substantially normal incidence, and for the incident light incident from a first optical stack side of the optical film, the optical film reflects more than about 60% of the incident light when the incident light is s-polarized and transmits more than about 45% of the incident light when the incident light is p-polarized. For the incident light propagating in the incident plane including the second direction, for each wavelength in the visible wavelength range, for substantially normal incidence, and for the incident light incident from a light absorbing second optical stack side of the optical film, the optical film reflects less than about 30% of the incident light when the incident light is s-polarized and transmits more than about 50% of the incident light when the incident light is p-polarized.

In some cases, optical characteristics (i.e., optical transmittance, optical reflectance, and optical absorption) of the optical film for the incident light incident at an oblique angle may be approximately similar to the optical characteristics for substantially normally incident light. The oblique angle may be between about 25 degrees and about 60 degrees.

Therefore, the optical film may have dual functions, i.e., optical absorption and optical reflectance based on various parameters, such as a polarization state and an incident angle of an incident light, and a direction of incidence (i.e., incident from the first or second optical stack sides). Specifically, for one or more wavelengths in the visible wavelength range, the optical film may be configured to substantially reflect the incident light when the incident light is polarized along a first direction and substantially normally or obliquely incident from the first optical stack side of the optical film, and substantially transmit the incident light when the incident light is polarized along a second direction, orthogonal to the first direction and incident from the first optical stack side of the optical film. Further, for one or more wavelengths in the visible wavelength range, the optical film may be configured to substantially absorb the incident light when the incident light is polarized along the first direction and substantially normally or obliquely incident from the light absorbing second optical stack side of the optical film, and substantially transmit the incident light when the incident light is polarized along the second direction and substantially normally or obliquely incident from the light absorbing second optical stack side of the optical film. Further, for one or more wavelengths in the visible wavelength range, the optical film may substantially block the incident light when the incident light is polarized along the first direction and substantially normally or obliquely incident from both the first and light absorbing second optical stack sides of the optical film. Moreover, for one or more wavelength in the visible wavelength range, the optical film may substantially pass or transmit the incident light when the incident light is polarized along the second direction and substantially normally or obliquely incident from both the first and light absorbing second optical stack sides of the optical film.

In some cases, the first optical stack side of the optical film faces a display, and the light absorbing second optical stack side of the optical film faces an eye of a viewer. Therefore, for one or more wavelengths in the visible wavelength range and for both substantially normal incidence and oblique incidence, the optical film may substantially block the incident light when the incident light is polarized along the first direction by substantially reflecting light which may be emitted by the display. This may facilitate recycling of light emitted by the display. In addition, for one or more wavelengths in the visible wavelength range and for both substantially normal incidence and oblique incidence, the optical film may substantially block the incident light when the incident light is polarized along the first direction by substantially absorbing light which may originate from external sources (e.g., ambient light). This may ensure that a less amount of ambient light is reflected toward the eye of the viewer. This may further prevent or substantially reduce optical artifacts, such as glare, from the optical film.

Conventional multi-function polarizers include layers of laminates. The different layers of laminates of such multi-function polarizers are laminated to each other using optical adhesives. Therefore, the different layers of laminates are required to be optically aligned. Optically aligning the different layers of laminates may be a complex process and may not provide a good optical alignment of the different layers. Further, the conventional multi-function polarizers may need to undergo additional processes, such as thermal forming, or heat-based 3D lamination. Moreover, as thermal properties of the different layers of laminates can be significantly different, it may make the additional processes challenging. Therefore, manufacturing such multi-function polarizers may require complex manufacturing processes, and may be time and cost intensive.

In some cases, the multi-function polarizers may be exposed to certain commonly used chemicals, such as hand sanitization chemicals, cleaning agents, lotions etc. In some cases, one or more layers of the different layers of laminates may be susceptible to such chemicals. Thus, the multi-function polarizers may be required to be resistant to such chemicals.

The optical film of the present disclosure may be manufactured with a good optical alignment between the first optical stack and the visible light absorbing second optical stack. Specifically, the optical film may have a better optical alignment than the conventional multi-function polarizers. Further, the optical film of the present disclosure may be designed with a single effective mechanical property. In other words, the optical film may have a similar physical structure across the optical film. Thus, the optical film may accommodate the additional processes, such as thermal forming, or heat-based 3D lamination, without any challenges or difficulty.

Moreover, the optical film of the present disclosure may be manufactured using chemical resistant materials, such that the optical film may be more compatible with the chemicals, such as hand sanitization chemicals, cleaning agents, lotions etc.

Referring now to Figures, FIG. 1 illustrates an optical film 200 according to an embodiment of the present disclosure. The optical film 200 defines mutually orthogonal x, y, and z-axes. The x and y-axes are the in-plane axes of the optical film 200, while the z-axis is a transverse axis along a thickness of the optical film 200. In other words, x and y-axes are disposed along a plane of the optical film 200, while the z-axis is perpendicular to the plane of the optical film 200. In some embodiments, optical systems 300, 300' (shown in FIGS. 6A and 6B) include the optical film 200 of the present disclosure, such that the z-axis of the optical film 200 is substantially parallel to optical system axes 70, 70' of the optical systems 300, 300', respectively.

FIG. 1 illustrates an incident light 40 propagating in an incident plane P including a second direction. The incident plane P may be defined as a plane including a normal N to the optical film 200, and a direction vector of the incident light 40. In the illustrated embodiment of FIG. 1, the normal N to the optical film 200 extends substantially along the z-axis and the incident plane P corresponds substantially to the y-z plane of the optical film 200. In some embodiments, the incident light 40 has an incident angle θ relative to the normal N to the optical film 200. In some embodiments, the incident light 40 may be substantially normally incident on the optical film 200, i.e., the incident angle θ is about 0 degree relative to the normal N. In some cases, the incident light 40 may be substantially normally incident on the optical film 200. In such cases, the incident light 40 may be referred to as "substantially normally incident light 40". In some other cases, the incident light 40 may be obliquely incident on the optical film 200. In such cases, the incident light 40 may be referred to as "obliquely incident light 40". In cases where the incident light 40 is incident at the incident angle θ, the incident light 40 may be referred to as "incident light 40 incident at the incident angle θ".

In some embodiments, the incident light 40 is polarized along a first direction. In some embodiments, the incident light 40 is polarized along the second direction orthogonal to the first direction. In some embodiments, the incident light 40 is polarized along the first direction and the second direction. In the illustrated embodiment of FIG. 1, the first direction is along the x-axis and the second direction is along the y-axis. In the illustrated embodiment of FIG. 1, the first direction is substantially orthogonal to the incident plane P and the second direction is substantially included in the incident plane P. In some embodiments, the optical film 200 substantially blocks the incident light 40 polarized along the first direction (i.e., the x-axis) and substantially transmits the incident light 40 polarized along the second direction (i.e., the y-axis).

In some embodiments, the incident light 40 is a s-polarized light. In the illustrated embodiment of FIG. 1, the incident light 40 polarized along the first direction (i.e., the x-axis) is the s-polarized light. In some embodiments, the incident light 40 is a p-polarized light. In the illustrated embodiment of FIG. 1, the incident light 40 polarized along the second direction is the p-polarized light. In some embodiments, the optical film 200 substantially blocks s-polarized light polarized and substantially transmits p-polarized light.

In other words, the incident light 40 polarized along the first direction is s-polarized, while the incident light 40 polarized along the second direction is p-polarized. In such cases, the incident light 40 polarized along the first direction is interchangeably referred to as "s-polarized light", and the incident light 40 polarized along the second direction is interchangeably referred to as "p-polarized light".

The optical film 200 includes a first optical stack 10 disposed on, and spaced apart from a visible light absorbing second optical stack 30. In some cases, the visible light absorbing second optical stack 30 is interchangeably referred to as "second optical stack 30".

The optical film 200 further includes a first optical stack side 210 and a light absorbing second optical stack side 220 opposite to the first optical stack side 210. The light absorbing second optical stack side 220 may be interchangeably referred to as "second optical stack side 220". The first and second optical stack sides 210, 220 are spaced apart from each other along the z-axis. In some embodiments, the first optical stack side 210 may face a display 80 (shown in FIGS. 6A and 6B), while the second optical stack side 220 may face an eye 100 of a viewer (shown in FIGS. 6A and 6B).

In the illustrated embodiment of FIG. 1, the first optical stack 10 is spaced apart by one or more spacer layers 20, 21 from the visible light absorbing second optical stack 30. In some embodiments, each of the one or more spacer layers 20, 21 has an average thickness "tsp". Specifically, each of the one or more spacer layers 20, 21 defines the average thicknesses "tsp" along the z-axis. In some embodiments, each of the one or more spacer layers 20, 21 has the average thickness "tsp" less than about 500 nm. In some embodiments, the average thickness "tsp" of each of the one or more spacer layers 20, 21 is less than about 400 nm, less than about 300 nm, less than about 250 nm, or less than about 200 nm. In some embodiments, the one or more spacer layers 20, 21 include at least two spacer layers 20, 21 separated by a middle polymeric layer 23. In some embodiments, the middle polymeric layer 23 has an average thickness "tin". Specifically, the middle polymeric layer 23 defines the average thickness "tin" along the z-axis. In some embodiments, the middle polymeric layer 23 has the average thickness "tin" less than about 500 nm. In some embodiments, the average thickness "tm" of the middle polymeric layer 23 is less than about 400 nm, less than about 300 nm, less than about 250 nm, or less than about 200 nm.

As shown in FIG. 1, the first optical stack side 210 is disposed proximate the first optical stack 10, while the second optical stack side 220 is disposed proximate the second optical stack 30.

Each of the first and second optical stacks 10, 30 includes a plurality of polymeric layers 15, 35. In some embodiments, the plurality of polymeric layers 15 of the first optical stack 10 includes a plurality of alternating first and second layers 11, 12. In some embodiments, the plurality of polymeric layers 35 of the second optical stack 30 includes a plurality of alternating polymeric first and visible light absorbing second layers 31, 32. The plurality of alternating polymeric visible light absorbing second layers 32 may be interchangeably referred to as "plurality of alternating second layers 32". In some embodiments, each of the first and second optical stacks 10, 30 includes the plurality of alternating polymeric first and second layers 11, 31, 12, 32. Specifically, the first optical stack 10 includes the plurality of alternating first and second layers 11, 12, while the second optical stack 30 includes the plurality of alternating first and second layers 31, 32. In some embodiments, the plurality of alternating polymeric first and second layers 11, 31, 12, 32 number at least 50 in total. In some embodiments, the plurality of alternating polymeric first and second layers 11, 31, 12, 32 number at least 75, at least 100, at least 150, or at least 200 in total. In some embodiments, the number of the plurality of alternating polymeric first and second layers 31, 32 may be less than the number of the plurality of alternating polymeric first and second layers 11, 12.

In some embodiments, the plurality of polymeric layers 15, 35 may include one or more polymeric materials, for example, polyethylene naphthalate (PEN), copolymers containing PEN and polyesters (e.g., polyethylene terephthalate (PET) or dibenzoic acid), glycol modified polyethylene terephthalate, polycarbonate (PC), poly (methyl methacrylate) (PMMA), or blends of these classes of materials.

In some embodiments, the plurality of polymeric layers 15, 35, may be co-extruded using processes that are common for commercial multilayer optical films. For example, the plurality of polymeric layers 15, 35 may include 275 alternating layers of 90/10 coPEN, a polymer composed of 90% polyethylene naphthalate (PEN) and 10% polyethylene terephthalate (PET), and a low index isotropic layer including a blend of polycarbonate (PC) and copolyesters (PC:coPET). In some embodiments, the low index layer may have a refractive index of about 1.57 and may remain substantially isotropic upon uniaxial orientation. In some embodiments, the PC:coPET molar ratio may be about 42.5 mol % polycarbonate and about 57.5 mol % coPE, and may include a glass transition temperature "Tg" of about 105 degrees Celsius (° C.). This isotropic material was chosen, such that, after stretching, its refractive indices in two non-stretch directions may remain substantially matched with those of the birefringent material in the non-stretching direction, while in the stretching direction there was a substantial mis-match in refractive indices between birefringent and non-birefringent layers.

In some examples, the 90/10 PEN and PC:coPET polymers may be fed from separate extruders to a multilayer coextrusion feedblock, in which they may be assembled into a packet of alternating optical layers numbering 275 in total, along with thicker protective boundary layers of the PC:coPET polymer on each side, for a total of 277 layers. After the feedblock, skin layers may be added. In some embodiments, the polymer used for the skin layers may be a second PC:coPET having a molar ratio of about 50 mol % PC and about 50 mol % coPET, and having a Tg of about 110° C. The multilayer melt may be then cast through a film die onto a chill roll, in the conventional manner for polyester films, upon which it may be quenched. The cast web may then be stretched in a parabolic tenter as described in U.S. Pat. No. 7,104,776 (Merrill et al.) at temperatures and draw ratios (about 6.0) similar to that described in Example 2A of US Patent Application Publication No. 2007/0047080 (Stover et al.).

In some embodiments, desired properties of the first and second optical stacks 10, 30 may be achieved by varying various parameters, such as materials of the plurality of alternating polymeric first and second layers 11, 12, 31, 32, thicknesses of the plurality of alternating polymeric first and second layers 11, 12, 31, 32, the total number of the plurality of alternating polymeric first and second layers 11, 12, 31, 32, etc., or a combination thereof.

Each of the polymeric layers 11, 12, 31, 32 has an average thickness "t". Specifically, each of the polymeric first and second layers 11, 31, 12, 32 has the average thickness "t". The average thickness "t" is substantially along the z-axis. The term "average thickness", as used herein, refers to an average thickness across a plane of a polymeric layer. In some embodiments, each of the polymeric layers 11, 12, 31, 32 has the average thickness "t" of less than about 500 nm. In some embodiments, each of the polymeric layers 11, 12, 31, 32 has the average thickness "t" of less than about 400 nm, less than about 300 nm, less than about 250 nm, or less than about 200 nm. In other words, each of the polymeric first and second layers 11, 12, 31, 32 has the average thickness "t" of less than about 500 nm, less than about 400 nm, less than about 300 nm, less than about 250 nm, or less than about 200 nm.

In some embodiments, the plurality of alternating polymeric first and visible light absorbing second layers 31, 32 of the second optical stack 30 have respective indices of refraction nx1 and nx2 along the first direction orthogonal to the second direction. In some embodiments, the first direction is along the x-axis and the second direction is along the y-axis. In some embodiments, nx1 is greater than nx2 by at least 0.1 for at least one wavelength in a visible wavelength range extending from about 420 nm to about 680 nm. In some embodiments, nx1 is greater than nx2 by a value of 0.15, 0.2, or 0.25 for the at least one wavelength in the visible wavelength range. In other words, the first layers 31 may include high index optical (HIO) layers, and the visible light absorbing second layers 32 may include low index optical (LIO) layers.

In such embodiments, at least the visible light absorbing second layers 32 of the second optical stack 30 are more light absorbing for the incident light 40 polarized along the first direction than the second direction.

In such embodiments, the visible light absorbing second layers 32 of the second optical stack 30 may include a light absorbing dye. In some embodiments, the light absorbing dye may be a visible light absorbing dye. In some embodiments, the light absorbing dye may be oriented. In some embodiments, the light absorbing dye may be colored or color neutral In some embodiments, the light absorbing dye may be a dichroic dye. In some embodiments, light absorbing dye may align with the polymer chain of the plurality of visible light absorbing second layers 32.

In some embodiments, the plurality of alternating first and second layers 11, 12 of the first optical stack 10 also have respective indices of refraction ny1 and ny2 along the second direction.

In some other embodiments, for each of the first and second optical stacks 10, 30, the first layers 11, 31 have a higher index of refraction than the second layers 12, 32 at least along an in-plane same first direction. In some embodiments, the in-plane same first direction is along the x-axis. In other words, the first layers 11, 31 may include HIO layers and the second layers 12, 32 may include LIO layers.

In such embodiments, at least the first layers 31 of the second optical stack 30 are more light absorbing for the incident light 40 polarized along the first direction than the second direction.

In such embodiments, at least the first layers 31 of the second optical stack 30 includes the light absorbing dye. In some embodiments, the light absorbing dye may align with the polymer chain of the first layers 31.

In some embodiments, the first optical stack 10 further includes at least one skin layer 13 having an average thickness “ts1”. The average thickness “ts1” is substantially along the z-axis. In some embodiments, the average thickness “ts1” is greater than about 500 nm. In some embodiments, the average thickness “ts1” is greater than about 750 nm, greater than about 1000 nm, greater than about 1500 nm, or greater than about 2000 nm.

The at least one skin layer 13 may act as a protective layer of the first optical stack 10. In the illustrated embodiment of FIG. 1, the first optical stack 10 includes the skin layer 13 disposed on the plurality of polymeric layers 15. For example, the skin layer 13 of FIG. 1 may act as a protective boundary layer (PBL) for the first optical stack 10.

In some embodiments, the second optical stack 30 further includes at least one visible light absorbing skin layer 33 having an average thickness “ts2”. The average thickness “ts2” is substantially along the z-axis. In some embodiments, the at least one visible light absorbing skin layer 33 has the average thickness “ts2” greater than about 500 nm. In some embodiments, the average thickness “ts2” of the at least one visible light absorbing skin layer 33 is greater than about 750 nm, greater than about 1000 nm, greater than about 1500 nm, or greater than about 2000 nm.

The at least one visible light absorbing skin layer 33 may act as a protective layer of the second optical stack 30. In the illustrated embodiment of FIG. 1, the second optical stack 30 includes the visible light absorbing skin layer 33 disposed on the plurality of polymeric layers 35. For example, the visible light absorbing skin layer 33 of FIG. 1 may act as a PBL for the second optical stack 30.

Figure 2:
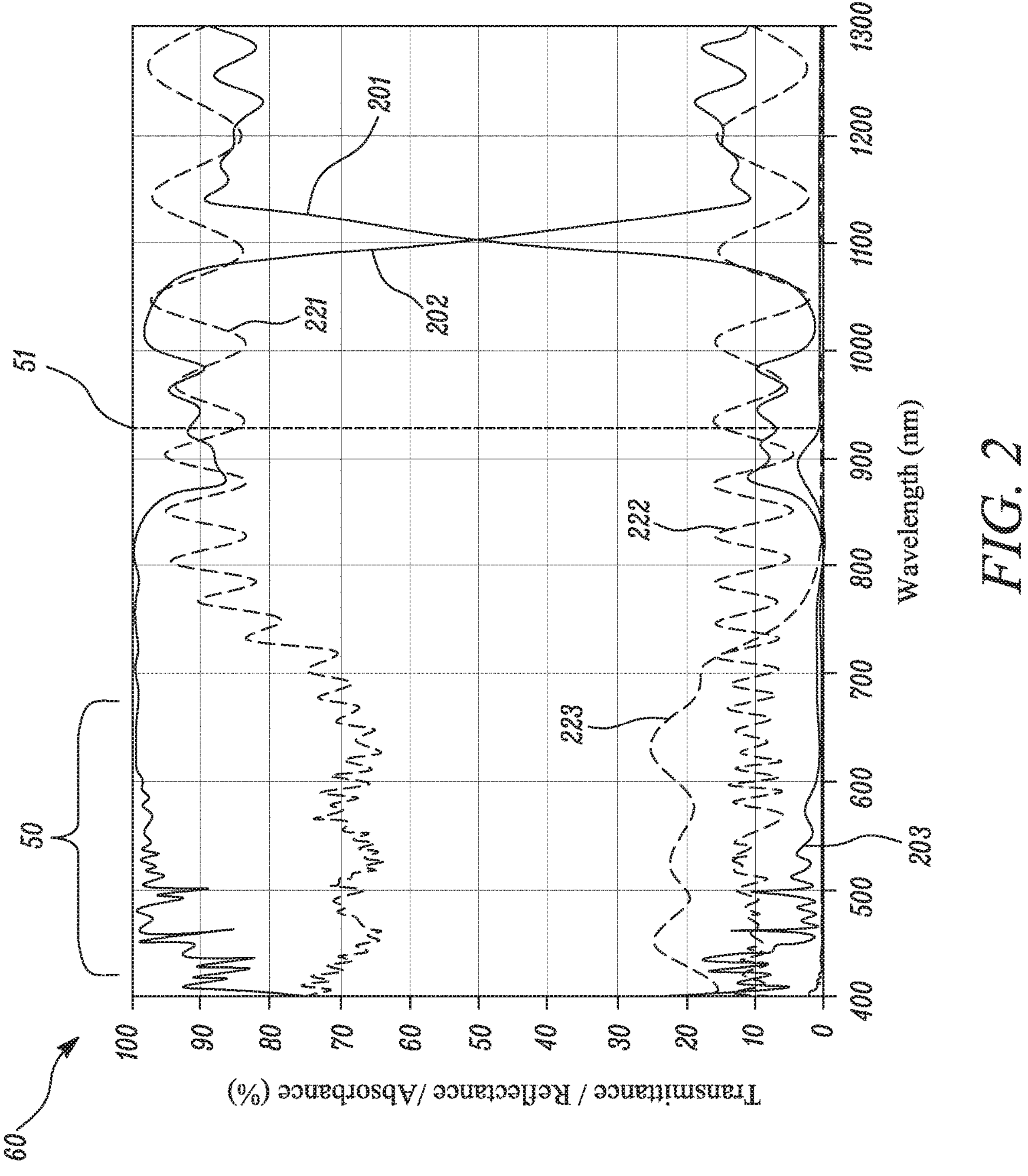
FIGS. 2 and 3 are graphs depicting optical characteristics of the optical film for normal incidence of an incident light, in accordance with an embodiment of the present disclosure.
Figure 3:
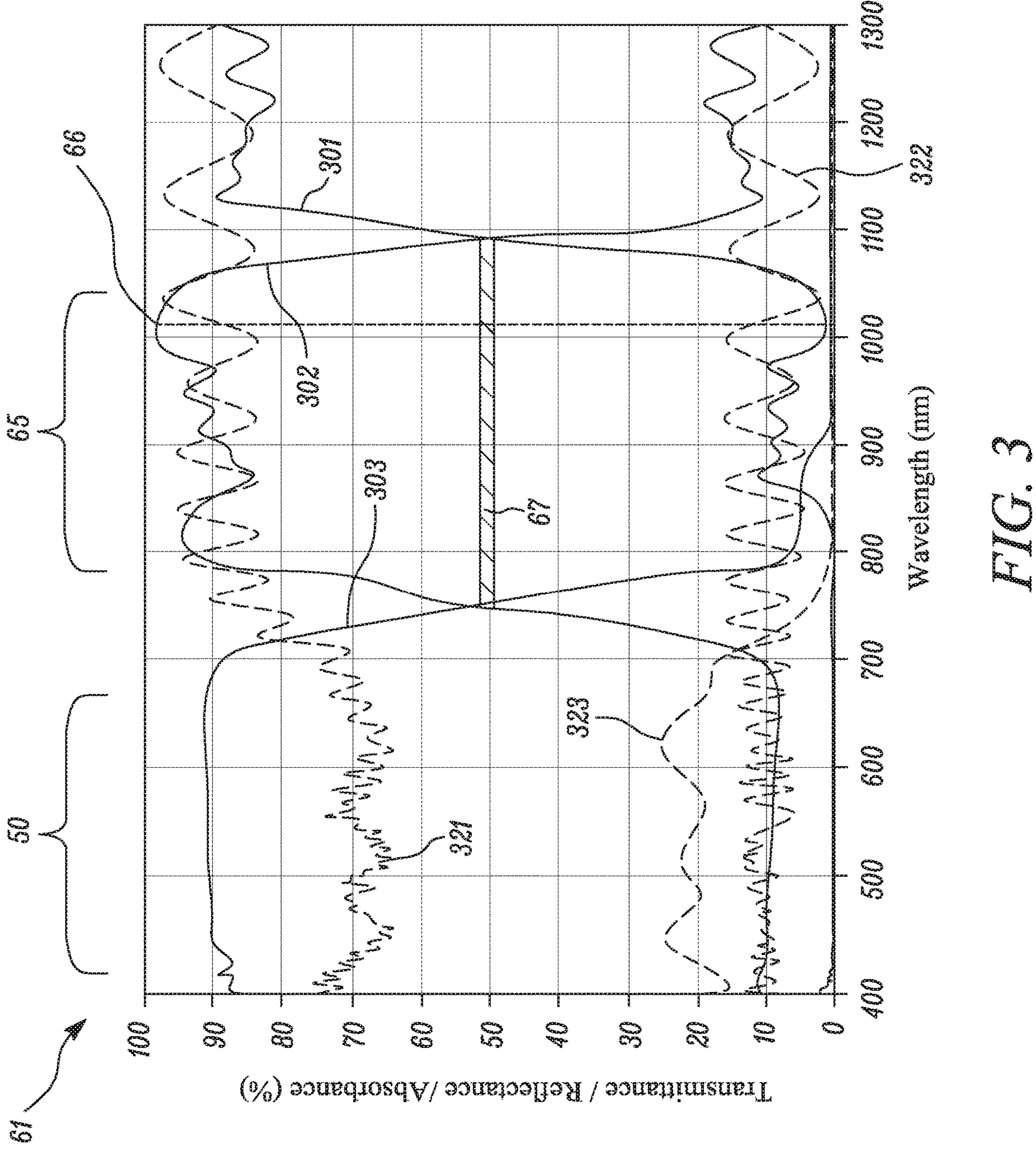

Referring to FIGS. 1, 2 and 3, graphs 60, 61 depict optical characteristics of the optical film 200 for the incident light 40 incident from the first optical stack side 210 and from the light absorbing second optical stack side 220, respectively, and for substantially normal incidence, according to an embodiment of the present disclosure. Specifically, the graphs 60, 61 depict optical transmittance, optical reflectance, and optical absorption of the optical film 200 for the incident light 40 incident from the first optical stack side 210 and from the light absorbing second optical stack side 220, respectively, and for substantially normal incidence. Wavelength is expressed in nanometers (nm) in the abscissa. Wavelength shown in the graphs 60, 61 include a visible wavelength range 50 extending from about 420 nm to about 680 nm and an infrared wavelength range extending from about 750 nm to about 1000 nm. The optical transmittance, the optical reflectance, and the optical absorption are expressed as a transmittance percentage, a reflectance percentage, and an absorption percentage, respectively, in the left ordinate.

Referring now to FIGS. 1 and 2, the graph 60 illustrates the optical characteristics of the optical film 200 for the incident light 40 incident from the first optical stack side 210 and for substantially normal incidence. The graph 60 includes a transmittance curve 201, a reflectance curve 202 and an absorption curve 203 for the incident light 40 polarized along the first direction (i.e., s-polarized) and incident from the first optical stack side 210, and for substantially normal incidence. The graph 60 further includes a transmittance curve 221, a reflectance curve 222 and an absorption curve 223 for the incident light 40 polarized along the second direction (i.e., p-polarized) and incident from the first optical stack side 210, and for substantially normal incidence.

In other words, in some embodiments, for a s-polarized light substantially normally incident from the first optical stack side 210: the transmittance curve 201 represents optical transmittance versus wavelength of the optical film 200, the reflectance curve 202 represents optical reflectance versus wavelength of the optical film 200, and the absorption curve 203 represents optical absorption versus wavelength of the optical film 200.

Further, in some embodiments, for a p-polarized light substantially normally incident from the first optical stack side 210: the transmittance curve 221 represents optical transmittance versus wavelength of the optical film 200, the reflectance curve 222 represents optical reflectance versus wavelength of the optical film 200, and the absorption curve 223 represents optical absorption versus wavelength of the optical film 200.

As depicted by the reflectance curve 202, in some embodiments, for each wavelength in the visible wavelength range 50, for substantially normal incidence, and for the incident light 40 incident from the first optical stack side 210 of the optical film 200, the optical film 200 reflects more than about 60% of the incident light 40 when the incident light 40 is s-polarized. In other words, for each wavelength in the visible wavelength range 50, for substantially normal incidence, and for the incident light 40 incident from the first optical stack side 210 of the optical film 200, the optical film 200 reflects more than about 60% of the incident light 40 when the incident light 40 is polarized along the first direction. In some embodiments, for each wavelength in the visible wavelength range 50, for substantially normal incidence, and for the incident light 40 incident from the first optical stack side 210 of the optical film 200, the optical film 200 reflects more than about 65%, more than about 70%, more than about 75%, or more than about 80% of the incident light 40 when the incident light 40 is s-polarized.

In some embodiments, for substantially normal incidence, and for the incident light 40 being s-polarized and incident from the first optical stack side 210 of the optical film 200, the optical film 200 reflects more than about 60% of the incident light 40 for at least one infrared wavelength 51 between about 750 nm and about 1000 nm or the infrared wavelength range. In some embodiments, for the incident light 40 being s-polarized and incident from the first optical stack side 210 of the optical film 200, the optical film 200 reflects more than about 65%, more than about 70%, more than about 75%, or more than about 80% of the incident light 40 for the at least one wavelength 51 in the infrared wavelength range.

Further, as depicted by the transmittance curve 201, in some embodiments, for each wavelength in the visible wavelength range 50, for substantially normal incidence, and for the incident light 40 incident from the first optical stack side 210 of the optical film 200, the optical film 200 transmits less than about 30% of the incident light 40 when the incident light 40 is s-polarized. In other words, for each wavelength in the visible wavelength range 50, for substantially normal incidence, and for the incident light 40 incident from the first optical stack side 210 of the optical film 200, the optical film 200 transmits less than about 30% of the incident light 40 when the incident light 40 is polarized along the first direction. In some embodiments, for each wavelength in the visible wavelength range 50, for substantially normal incidence, and for the incident light 40 incident from the first optical stack side 210 of the optical film 200, the optical film 200 transmits less than about 25%, less than about 20%, less than about 15%, or less than about 10% of the incident light 40 when the incident light 40 is s-polarized.

As depicted by the absorption curve 203, in some embodiments, for each wavelength in the visible wavelength range 50, for substantially normal incidence, and for the incident light 40 incident from the first optical stack side 210 of the optical film 200, the optical film 200 absorbs less than about 40% of the incident light 40 when the incident light 40 is s-polarized. In other words, for each wavelength in the visible wavelength range 50, for substantially normal incidence, and for the incident light 40 incident from the first optical stack side 210 of the optical film 200, the optical film 200 absorbs less than about 40% of the incident light 40 when the incident light 40 is polarized along the first direction. In some embodiments, for each wavelength in the visible wavelength range 50, for substantially normal incidence, and for the incident light 40 incident from the first optical stack side 210 of the optical film 200, the optical film 200 absorbs less than about 35%, or less than about 30% of the incident light 40 when the incident light 40 is s-polarized.

Therefore, as is apparent from the graph 60, for each wavelength in the visible wavelength range 50, the optical film 200 may be configured to substantially block the incident light 40 by substantially reflecting the incident light 40 when the incident light 40 is s-polarized and substantially normally incident from the first optical stack side 210. Further, for the at least one infrared wavelength 51, the optical film 200 may be configured to substantially block the incident light 40 by substantially reflecting the incident light 40 when the incident light 40 is s-polarized and substantially normally incident from the first optical stack side 210.

As depicted by the transmittance curve 221, in some embodiments, for each wavelength in the visible wavelength range 50, for substantially normal incidence, and for the incident light 40 incident from the first optical stack side 210 of the optical film 200, the optical film 200 transmits more than about 45% of the incident light 40 when the incident light 40 is p-polarized. In other words, for each wavelength in the visible wavelength range 50, for substantially normal incidence, and for the incident light 40 incident from the first optical stack side 210 of the optical film 200, the optical film 200 transmits more than about 45% of the incident light 40 when the incident light 40 is polarized along the second direction. In some embodiments, for each wavelength in the visible wavelength range 50, for substantially normal incidence, and for the incident light 40 incident from the first optical stack side 210 of the optical film 200, the optical film 200 transmits more than about 50%, more than about 55%, or more than about 60% of the incident light 40 when the incident light 40 is p-polarized.

Further, as depicted by the reflectance curve 222, in some embodiments, for each wavelength in the visible wavelength range 50, for substantially normal incidence, and for the incident light 40 incident from the first optical stack side 210 of the optical film 200, the optical film 200 reflects less than about 30% of the incident light 40 when the incident light 40 is p-polarized. In other words, for each wavelength in the visible wavelength range 50, for substantially normal incidence, and for the incident light 40 incident from the first optical stack side 210 of the optical film 200, the optical film 200 reflects less than about 30% of the incident light 40 when the incident light 40 is polarized along the second direction. In some embodiments, for each wavelength in the visible wavelength range 50, for substantially normal incidence, and for the incident light 40 incident from the first optical stack side 210 of the optical film 200, the optical film 200 reflects less than about 25%, or less than about 20% of the incident light 40 when the incident light 40 is p-polarized.

As depicted by the absorption curve 223, in some embodiments, for each wavelength in the visible wavelength range 50, for substantially normal incidence, and for the incident light 40 incident from the first optical stack side 210 of the optical film 200, the optical film 200 absorbs less than about 40% of the incident light 40 when the incident light 40 is p-polarized. In other words, for each wavelength in the visible wavelength range 50, for substantially normal incidence, and for the incident light 40 incident from the first optical stack side 210 of the optical film 200, the optical film 200 absorbs less than about 40% of the incident light 40 when the incident light 40 is polarized along the second direction. In some embodiments, for each wavelength in the visible wavelength range 50, for substantially normal incidence, and for the incident light 40 incident from the first optical stack side 210 of the optical film 200, the optical film 200 absorbs less than about 35%, or less than about 30% of the incident light 40 when the incident light 40 is p-polarized.

Therefore, for each wavelength in the visible wavelength range 50, the optical film 200 may be configured to substantially transmit the incident light 40, when the incident light 40 is p-polarized and substantially normally incident from the first optical stack side 210.

As is apparent from the graph 60 of FIG. 2, for substantially normally incident light 40 and for at least 80% of wavelengths in the visible wavelength range 50, the plurality of alternating polymeric first and second layers 11, 12 (shown in FIG. 1) for at least the first optical stack 10 reflects more than about 60% of the incident light 40 polarized along the first direction. In some embodiments, for substantially normally incident light 40 and for at least 80% of wavelengths in the visible wavelength range 50, the plurality of alternating polymeric first and second layers 11, 12 for at least the first optical stack 10 reflects more than about 65%, more than about 70%, more than about 75%, or more than about 80% of the incident light 40 polarized along the first direction. Therefore, for a substantially normally incident light and for at least 80% of wavelengths in the visible wavelength range 50, the plurality of alternating polymeric first and second layers 11, 12 of at least the first optical stack 10 may be configured to substantially reflect the incident light polarized along the first direction.

Further, as is apparent from the graph 60 of FIG. 2, for substantially normally incident light 40 and for at least 80% of wavelengths in the visible wavelength range 50, the plurality of alternating polymeric first and second layers 11, 12 (shown in FIG. 1) for at least the first optical stack 10 transmits more than about 45% of the incident light 40 polarized along the second direction. In some embodiments, for substantially normally incident light 40 and for at least 80% of wavelengths in the visible wavelength range 50, the plurality of alternating polymeric first and second layers 11, 12 for the at least first optical stack 10 transmits more than about 50%, more than about 55%, or more than about 60% of the incident light 40 polarized along the second direction. Therefore, for a substantially normally incident light and for at least 80% of wavelengths in the visible wavelength range 50, the plurality of alternating polymeric first and second layers 11, 12 of at least the first optical stack 10 may be configured to substantially transmit the incident light polarized along the second direction.

Referring now to FIGS. 1 and 3, the graph 61 illustrates the optical characteristics of the optical film 200 for the incident light 40 incident from the light absorbing second optical stack side 220 and for substantially normal incidence. The graph 61 includes a transmittance curve 301, a reflectance curve 302 (interchangeably referred to as "optical reflectance of the optical film versus wavelength 302") and an absorption curve 303 for the incident light 40 polarized along the first direction (i.e., s-polarized), and incident from the light absorbing second optical stack side 220, and for substantially normal incidence. The graph 61 further includes a transmittance curve 321, a reflectance curve 322 and an absorption curve 323 for the incident light 40 polarized along the second direction (i.e., p-polarized light), and incident from the light absorbing second optical stack side 220, and for substantially normal incidence.

In other words, in some embodiments, for a s-polarized light substantially normally incident from the second optical stack side 220: the transmittance curve 301 represents optical transmittance versus wavelength of the optical film 200, the reflectance curve 302 represents optical reflectance versus wavelength of the optical film 200, and the absorption curve 303 represents optical absorption versus wavelength of the optical film 200.

Further, in some embodiments, for a p-polarized light substantially normally incident from the second optical stack side 220: the transmittance curve 321 represents optical transmission versus wavelength of the optical film 200, the reflectance curve 322 represents optical reflection versus wavelength of the optical film 200, and the absorption curve 323 represents optical absorption versus wavelength of the optical film 200.

As depicted by the reflectance curve 302, in some embodiments, for each wavelength in the visible wavelength range 50, for substantially normal incidence, and for the incident light 40 incident from the light absorbing second optical stack side 220 of the optical film 200, the optical film 200 reflects less than about 30% of the incident light 40 when the incident light 40 is s-polarized. In other words, for each wavelength in the visible wavelength range 50, for substantially normal incidence, and for the incident light 40 incident from the light absorbing second optical stack side 220 of the optical film 200, the optical film 200 reflects less than about 30% of the incident light 40 when the incident light 40 is polarized along the first direction. In some embodiments, for each wavelength in the visible wavelength range 50, for substantially normal incidence, and for the incident light 40 incident from the light absorbing second optical stack side 220 of the optical film 200, the optical film 200 reflects less than about 25%, less than about 20%, or less than about 15% of the incident light 40 when the incident light 40 is s-polarized.

Further, in some embodiments, for the incident light 40 being s-polarized and for substantially normal incidence, the optical reflectance of the optical film versus wavelength 302 includes a reflection band 65 at least 100 nm wide. In some embodiments, the reflection band is at least 150 nm wide, or at least 200 nm wide. The reflection band 65 is disposed between about 650 nm and about 1200 nm. Further, the reflection band 65 has a reflection peak 66 greater than about 70%. In other words, an optical reflectance of the optical film 200 at the reflection peak 66 is greater than about 70%. In some embodiments, the reflection peak 66 is greater than about 75%, greater than about 80%, greater than about 85%, or greater than about 90%. In some embodiments, the reflection band 65 has a first full width at half maxima (FWHM) 67. Therefore, the optical film 200 may be configured to substantially block the incident light 40 by substantially reflecting the incident light 40 when the incident light 40 is s-polarized and incident from the light absorbing second optical stack side 220 for at least one wavelength in the reflection band 65. The at least one wavelength may be in the infrared wavelength range.

Further, as depicted by the transmittance curve 301, in some embodiments, for each wavelength in the visible wavelength range 50, for substantially normal incidence, and for the incident light 40 incident from the light absorbing second optical stack side 220 of the optical film 200, the optical film 200 transmits less than about 30% of the incident light 40 when the incident light 40 is s-polarized. In other words, for each wavelength in the visible wavelength range 50, for substantially normal incidence, and for the incident light 40 incident from the light absorbing second optical stack side 220 of the optical film 200, the optical film 200 transmits less than about 30% of the incident light 40 when the incident light 40 is polarized along the first direction. In some embodiments, for each wavelength in the visible wavelength range 50, for substantially normal incidence, and for the incident light 40 incident from the light absorbing second optical stack side 220 of the optical film 200, the optical film 200 transmits less than about 25%, less than about 20%, or less than about 15% of the incident light 40 when the incident light 40 is s-polarized.

As depicted by the absorption curve 303, in some embodiments, for each wavelength in the visible wavelength range 50, for substantially normal incidence, and for the incident light 40 incident from the light absorbing second optical stack side 220 of the optical film 200, the optical film 200 absorbs more than about 60% of the incident light 40 when the incident light 40 is s-polarized. In other words, for each wavelength in the visible wavelength range 50, for substantially normal incidence, and for the incident light 40 incident from the light absorbing second optical stack side 220 of the optical film 200, the optical film 200 absorbs more than about 60% of the incident light 40 when the incident light 40 is polarized along the first direction. In some embodiments, for each wavelength in the visible wavelength range 50, for substantially normal incidence, and for the incident light 40 incident from the light absorbing second optical stack side 220 of the optical film 200, the optical film 200 absorbs more than about 75%, more than about 80%, or more than about 85% of the incident light 40 when the incident light 40 is s-polarized.

Therefore, as is apparent from the graph 61, for each wavelength in the visible wavelength range 50, the optical film 200 may be configured to substantially block the incident light 40 by substantially absorbing the incident light 40 when the incident light 40 is s-polarized and substantially normally incident from the light absorbing second optical stack side 220. Further, for at least one wavelength in the reflection band 65, the optical film 200 may be configured to substantially block the incident light 40 by substantially reflecting the incident light 40 when the incident light 40 is s-polarized and incident from the light absorbing second optical stack side 220. The at least one wavelength may be in the infrared wavelength range.

As depicted by the transmittance curve 321, in some embodiments, for each wavelength in the visible wavelength range 50, for substantially normal incidence, and for the incident light 40 incident from the light absorbing second optical stack side 220 of the optical film 200, the optical film 200 transmits more than about 50% of the incident light 40 when the incident light 40 is p-polarized. In other words, for each wavelength in the visible wavelength range 50, for substantially normal incidence, and for the incident light 40 incident from the light absorbing second optical stack side 220 of the optical film 200, the optical film 200 transmits more than about 50% of the incident light 40 when the incident light 40 is polarized along the second direction. In some embodiments, for each wavelength in the visible wavelength range 50, for substantially normal incidence, and for the incident light 40 incident from the light absorbing second optical stack side 220 of the optical film 200, the optical film 200 transmits more than about 55%, or more than about 60% of the incident light 40 when the incident light 40 is p-polarized.

Further, as depicted by the reflectance curve 322, in some embodiments, for each wavelength in the visible wavelength range 50, for substantially normal incidence, and for the incident light 40 incident from the light absorbing second optical stack side 220 of the optical film 200, the optical film 200 reflects less than about 30% of the incident light 40 when the incident light 40 is p-polarized. In other words, for each wavelength in the visible wavelength range 50, for substantially normal incidence, and for the incident light 40 incident from the light absorbing second optical stack side 220 of the optical film 200, the optical film 200 reflects less than about 30% of the incident light 40 when the incident light 40 is polarized along the second direction. In some embodiments, for each wavelength in the visible wavelength range 50, for substantially normal incidence, and for the incident light 40 incident from the light absorbing second optical stack side 220 of the optical film 200, the optical film 200 reflects less than about 25%, or less than about 20% of the incident light 40 when the incident light 40 is p-polarized.

As depicted by the absorption curve 323, in some embodiments, for each wavelength in the visible wavelength range 50, for substantially normal incidence, and for the incident light 40 incident from the light absorbing second optical stack side 220 of the optical film 200, the optical film 200 absorbs less than about 40% of the incident light 40 when the incident light 40 is p-polarized. In other words, for each wavelength in the visible wavelength range 50, for substantially normal incidence, and for the incident light 40 incident from the light absorbing second optical stack side 220 of the optical film 200, the optical film 200 absorbs less than about 40% of the incident light 40 when the incident light 40 is polarized along the second direction. In some embodiments, for each wavelength in the visible wavelength range 50, for substantially normal incidence, and for the incident light 40 incident from the light absorbing second optical stack side 220 of the optical film 200, the optical film 200 absorbs less than about 35%, or less than about 30% of the incident light 40 when the incident light 40 is p-polarized.

Therefore, as is apparent from the graph 61, for each wavelength in the visible wavelength range 50, the optical film 200 may be configured to substantially transmit the incident light 40, when the incident light 40 is p-polarized and substantially normally incident from the light absorbing second optical stack side 220.

Figure 4:
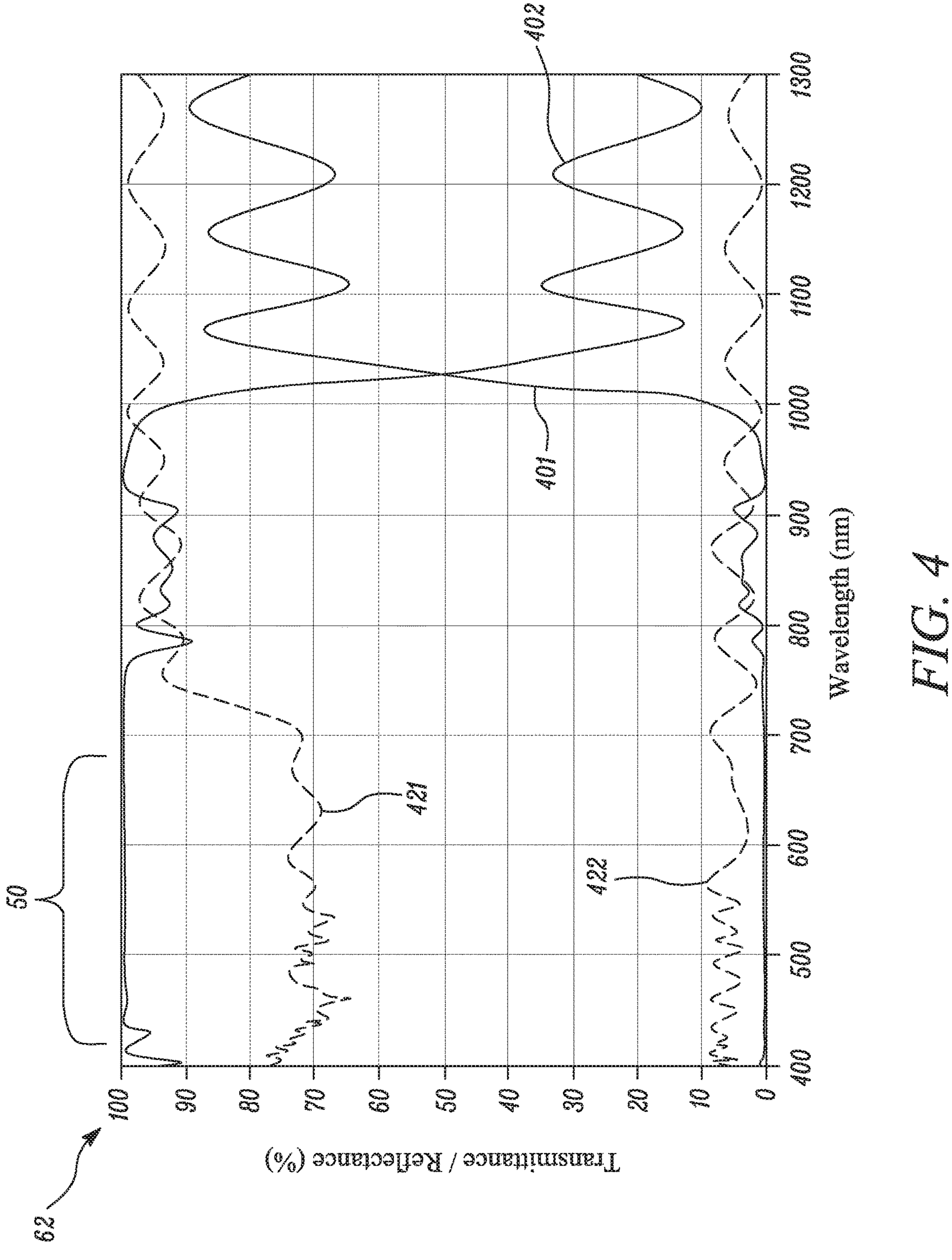
FIGS. 4 and 5 are graphs depicting optical characteristics of the optical film for oblique incidence of an incident light, in accordance with an embodiment of the present disclosure.
Figure 5:
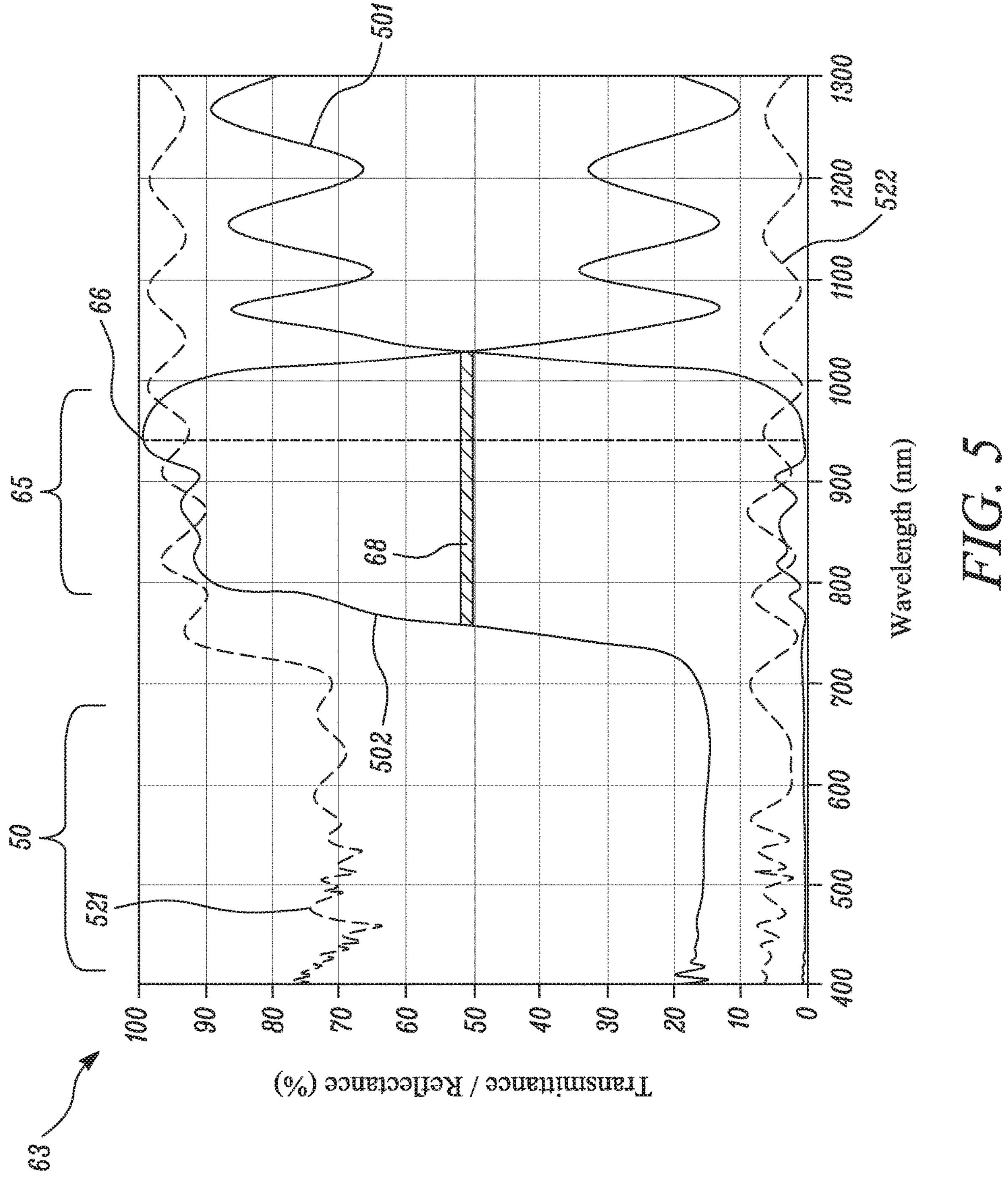

Referring to FIGS. 1, 4 and 5, graphs 62, 63 depict optical characteristics of the optical film 200 for the incident light 40 incident from the first optical stack side 210 and from the light absorbing second optical stack side 220, respectively, and for the incident angle θ of between about 25 and about 60 degrees, according to an embodiment of the present disclosure. In some embodiments, the incident angle θ is between about 30 degrees and about 50 degrees, or between about 35 degrees and about 45 degrees. In some embodiments, the graphs 62, 63 depict the optical characteristics of the optical film 200 for the incident light 40 incident from the first optical stack side 210 and from the light absorbing second optical stack side 220, respectively, and for the incident angle θ of about 40 degrees. Specifically, the graphs 62, 63 depict optical transmittance and optical reflectance of the optical film 200 for the incident light 40, incident from the first optical stack side 210 and from the light absorbing second optical stack side 220, respectively, and for the incident angle θ of about 40 degrees. Wavelength is expressed in nanometers (nm) in the abscissa. Wavelength shown in the graphs 62, 63 include the visible wavelength range 50 and the infrared wavelength range. The optical transmittance and optical reflectance are expressed as a transmittance percentage and a reflectance percentage, respectively, in the left ordinate.

Referring now to FIGS. 1 and 4, the graph 62 illustrates the optical characteristics of the optical film 200 for the incident light 40 incident from the first optical stack side 210 and for the incident angle θ of between about 25 and about 60 degrees. The graph 62 includes a transmittance curve 401 and a reflectance curve 402 for the incident light 40 polarized along the first direction (i.e., s-polarized) and incident from the first optical stack side 210, and for the incident angle θ of between about 25 and about 60 degrees. The graph 62 further includes a transmittance curve 421 and a reflectance curve 422 for the incident light 40 polarized along the second direction (i.e., p-polarized) and incident from the first optical stack side 210, and for the incident angle θ of between about 25 and about 60 degrees.

In other words, in some embodiments, for a s-polarized light obliquely incident from the first optical stack side 210 at the incident angle θ of between about 25 and about 60 degrees: the transmittance curve 401 represents optical transmittance versus wavelength of the optical film 200, and the reflectance curve 402 represents optical reflectance versus wavelength of the optical film 200.

Further, in some embodiments, for a p-polarized light obliquely incident from the first optical stack side 210 at the incident angle θ of between about 25 and about 60 degrees: the transmittance curve 421 represents optical transmittance versus wavelength of the optical film 200, and the reflectance curve 422 represents optical reflectance versus wavelength of the optical film 200.

As depicted by the reflectance curve 402, in some embodiments, for each wavelength in the visible wavelength range 50, for the incident angle θ of between about 25 and about 60 degrees, and for the incident light 40 incident from the first optical stack side 210 of the optical film 200, the optical film 200 reflects more than about 60% of the incident light 40 when the incident light 40 is s-polarized. In other words, for each wavelength in the visible wavelength range 50, for the incident angle θ of between about 25 and about 60 degrees, and for the incident light 40 incident from the first optical stack side 210 of the optical film 200, the optical film 200 reflects more than about 60% of the incident light 40 when the incident light 40 is polarized along the first direction. In some embodiments, for each wavelength in the visible wavelength range 50, for the incident angle θ of between about 25 and about 60 degrees, and for the incident light 40 incident from the first optical stack side 210 of the optical film 200, the optical film 200 reflects more than about 65%, more than about 70%, more than about 75%, more than about 80%, or more than about 85% of the incident light 40 when the incident light 40 is s-polarized.

Further, as depicted by the transmittance curve 401, in some embodiments, for each wavelength in the visible wavelength range 50, for the incident angle θ of between about 25 and about 60 degrees, and for the incident light 40 incident from the first optical stack side 210 of the optical film 200, the optical film 200 transmits less than about 30% of the incident light 40 when the incident light 40 is s-polarized. In other words, for each wavelength in the visible wavelength range 50, for the incident angle θ of between about 25 and about 60 degrees, and for the incident light 40 incident from the first optical stack side 210 of the optical film 200, the optical film 200 transmits less than about 30% of the incident light 40 when the incident light 40 is polarized along the first direction. In some embodiments, for each wavelength in the visible wavelength range 50, for the incident angle θ of between about 25 and about 60 degrees, and for the incident light 40 incident from the first optical stack side 210 of the optical film 200, the optical film 200 transmits less than about 25%, less than about 20%, less than about 15%, or less than about 10% of the incident light 40 when the incident light 40 is s-polarized.

Therefore, as is apparent from the graph 62, for each wavelength in the visible wavelength range 50, the optical film 200 may be configured to substantially block the incident light 40 by substantially reflecting the incident light 40 when the incident light 40 is s-polarized and obliquely incident from the first optical stack side 210 at the incident angle θ of between about 25 and about 60 degrees.

As depicted by the transmittance curve 421, in some embodiments, for each wavelength in the visible wavelength range 50, for the incident angle θ of between about 25 and about 60 degrees, and for the incident light 40 incident from the first optical stack side 210 of the optical film 200, the optical film 200 transmits more than about 45% of the incident light 40 when the incident light 40 is p-polarized. In other words, for each wavelength in the visible wavelength range 50, for the incident angle θ of between about 25 and about 60 degrees, and for the incident light 40 incident from the first optical stack side 210 of the optical film 200, the optical film 200 transmits more than about 45% of the incident light 40 when the incident light 40 is polarized along the second direction. In some embodiments, for each wavelength in the visible wavelength range 50, for the incident angle θ of between about 25 and about 60 degrees, and for the incident light 40 incident from the first optical stack side 210 of the optical film 200, the optical film 200 transmits more than about 50%, more than about 55%, or more than about 60% of the incident light 40 when the incident light 40 is p-polarized.

Further, as depicted by the reflectance curve 422, in some embodiments, for each wavelength in the visible wavelength range 50, for the incident angle θ of between about 25 and about 60 degrees, and for the incident light 40 incident from the first optical stack side 210 of the optical film 200, the optical film 200 reflects less than about 30% of the incident light 40 when the incident light 40 is p-polarized. In other words, for each wavelength in the visible wavelength range 50, for the incident angle θ of between about 25 and about 60 degrees, and for the incident light 40 incident from the first optical stack side 210 of the optical film 200, the optical film 200 reflects less than about 30% of the incident light 40 when the incident light 40 is polarized along the second direction. In some embodiments, for each wavelength in the visible wavelength range 50, for the incident angle θ of between about 25 and about 60 degrees, and for the incident light 40 incident from the first optical stack side 210 of the optical film 200, the optical film 200 reflects less than about 25%, less than about 20%, or less than about 15% of the incident light 40 when the incident light 40 is p-polarized.

Therefore, for each wavelength in the visible wavelength range 50, the optical film 200 may be configured to substantially transmit the incident light 40, when the incident light 40 is p-polarized and obliquely incident from the first optical stack side 210 at the incident angle θ of between about 25 and about 60 degrees.

Referring now to FIGS. 1 and 5, the graph 63 illustrates the optical characteristics of the optical film 200 for the incident light 40 incident from the light absorbing second optical stack side 220 and for the incident angle θ of between about 25 and about 60 degrees. The graph 63 includes a transmittance curve 501 and a reflectance curve 502 (interchangeably referred to as "optical reflectance of the optical film versus wavelength 502") for the incident light 40 polarized along the first direction (i.e., s-polarized) and incident from the light absorbing second optical stack side 220, and for the incident angle θ of between about 25 and about 60 degrees. The graph 63 further includes a transmittance curve 521 and a reflectance curve 522 for the incident light 40 polarized along the second direction (i.e., p-polarized) and incident from the light absorbing second optical stack side 220, and for the incident angle θ of between about 25 and about 60 degrees.

In other words, in some embodiments, for a s-polarized light obliquely incident from the second optical stack side 220 at the incident angle θ of between about 25 and about 60 degrees: the transmittance curve 501 represents optical transmittance versus wavelength of the optical film 200, and the reflectance curve 502 represents optical reflectance versus wavelength of the optical film 200.

Further, in some embodiments, for a p-polarized light obliquely incident from the second optical stack side 210 at the incident angle θ of between about 25 and about 60 degrees: the transmittance curve 521 represents optical transmittance versus wavelength of the optical film 200, and the reflectance curve 522 represents optical reflectance versus wavelength of the optical film 200.

As depicted by the reflectance curve 502, in some embodiments, for each wavelength in the visible wavelength range 50, for the incident angle θ of between about 25 and about 60 degrees, and for the incident light 40 incident from the light absorbing second optical stack side 220 of the optical film 200, the optical film 200 reflects less than about 40% of the incident light 40 when the incident light 40 is s-polarized. In other words, for each wavelength in the visible wavelength range 50, for the incident angle θ of between about 25 and about 60 degrees, and for the incident light 40 incident from the light absorbing second optical stack side 220 of the optical film 200, the optical film 200 reflects less than about 40% of the incident light 40 when the incident light 40 is polarized along the first direction. In some embodiments, for each wavelength in the visible wavelength range 50, for the incident angle θ of between about 25 and about 60 degrees, and for the incident light 40 incident from the light absorbing second optical stack side 220 of the optical film 200, the optical film 200 reflects less than about 35%, less than about 30%, less than about 25%, or less than about 20% of the incident light 40 when the incident light 40 is s-polarized.

Further, for the incident light 40 being s-polarized and for the incident angle θ of between about 25 and about 60 degrees, the optical reflectance of the optical film versus wavelength 502 includes the reflection band 65 having the reflection peak 66. However, for the incident light 40 being s-polarized and for the incident angle θ of between about 25 and about 60 degrees, the optical reflectance of the optical film versus wavelength 502 includes a second FWHM 68 different from the first FWHM 67 shown in FIG. 3.

As is apparent from the graphs 61, 63 shown in FIGS. 3 and 5, respectively, in some embodiments, increasing the incident angle θ by between about 25 and about 60 degrees, the first FWHM 67 of the reflection band 65 decreases to the second FWHM 68.

Further, as depicted by the transmittance curve 501, in some embodiments, for each wavelength in the visible wavelength range 50, for the incident angle θ of between about 25 and about 60 degrees, and for the incident light 40 incident from the light absorbing second optical stack side 220 of the optical film 200, the optical film 200 transmits less than about 30% of the incident light 40 when the incident light 40 is s-polarized. In other words, for each wavelength in the visible wavelength range 50, for the incident angle θ of between about 25 and about 60 degrees, and for the incident light 40 incident from the light absorbing second optical stack side 220 of the optical film 200, the optical film 200 transmits less than about 30% of the incident light 40 when the incident light 40 is polarized along the first direction. In some embodiments, for each wavelength in the visible wavelength range 50, for the incident angle θ of between about 25 and about 60 degrees, and for the incident light 40 incident from the light absorbing second optical stack side 220 of the optical film 200, the optical film 200 transmits less than about 25%, less than about 20%, less than about 15%, or less than about 10% of the incident light 40 when the incident light 40 is s-polarized.

Since both an average optical transmittance and an average optical reflectance of the optical film 200 corresponding to the respective transmittance and reflectance curves 501, 502 are substantially low (e.g., less than about 30% or about 40%) in the visible wavelength range 50, the optical film 200 may substantially block the incident light 40, for each wavelength in the visible wavelength range 50, by substantially absorbing the incident light 40 when the incident light 40 is s-polarized and obliquely incident from the light absorbing second optical stack side 220 at the incident angle θ of between about 25 and about 60 degrees.

As depicted by the transmittance curve 521, in some embodiments, for each wavelength in the visible wavelength range 50, for the incident angle θ of between about 25 and about 60 degrees, and for the incident light 40 incident from the light absorbing second optical stack side 220 of the optical film 200, the optical film 200 transmits more than about 50% of the incident light 40 when the incident light 40 is p-polarized. In other words, for each wavelength in the visible wavelength range 50, for the incident angle θ of between about 25 and about 60 degrees, and for the incident light 40 incident from the light absorbing second optical stack side 220 of the optical film 200, the optical film 200 transmits more than about 50% of the incident light 40 when the incident light 40 is polarized along the second direction. In some embodiments, for each wavelength in the visible wavelength range 50, for the incident angle θ of between about 25 and about 60 degrees, and for the incident light 40 incident from the light absorbing second optical stack side 220 of the optical film 200, the optical film 200 transmits more than about 55%, or more than about 60% of the incident light 40 when the incident light 40 is p-polarized.

Further, as depicted by the reflectance curve 522, in some embodiments, for each wavelength in the visible wavelength range 50, for the incident angle θ of between about 25 and about 60 degrees, and for the incident light 40 incident from the light absorbing second optical stack side 220 of the optical film 200, the optical film 200 reflects less than about 30% of the incident light 40 when the incident light 40 is p-polarized. In other words, for each wavelength in the visible wavelength range 50, for the incident angle θ of between about 25 and about 60 degrees, and for the incident light 40 incident from the light absorbing second optical stack side 220 of the optical film 200, the optical film 200 reflects less than about 30% of the incident light 40 when the incident light 40 is polarized along the second direction. In some embodiments, for each wavelength in the visible wavelength range 50, for the incident angle θ of between about 25 and about 60 degrees, and for the incident light 40 incident from the light absorbing second optical stack side 220 of the optical film 200, the optical film 200 reflects less than about 25%, less than about 20%, reflects less than about 15%, or less than about 10% of the incident light 40 when the incident light 40 is p-polarized.

Therefore, as is apparent from the graph 63, for each wavelength in the visible wavelength range 50, the optical film 200 may be configured to substantially transmit the incident light 40, when the incident light 40 is p-polarized and obliquely incident from the light absorbing second optical stack side 220 at the incident angle θ of between about 25 and about 60 degrees.

Figure 6A:
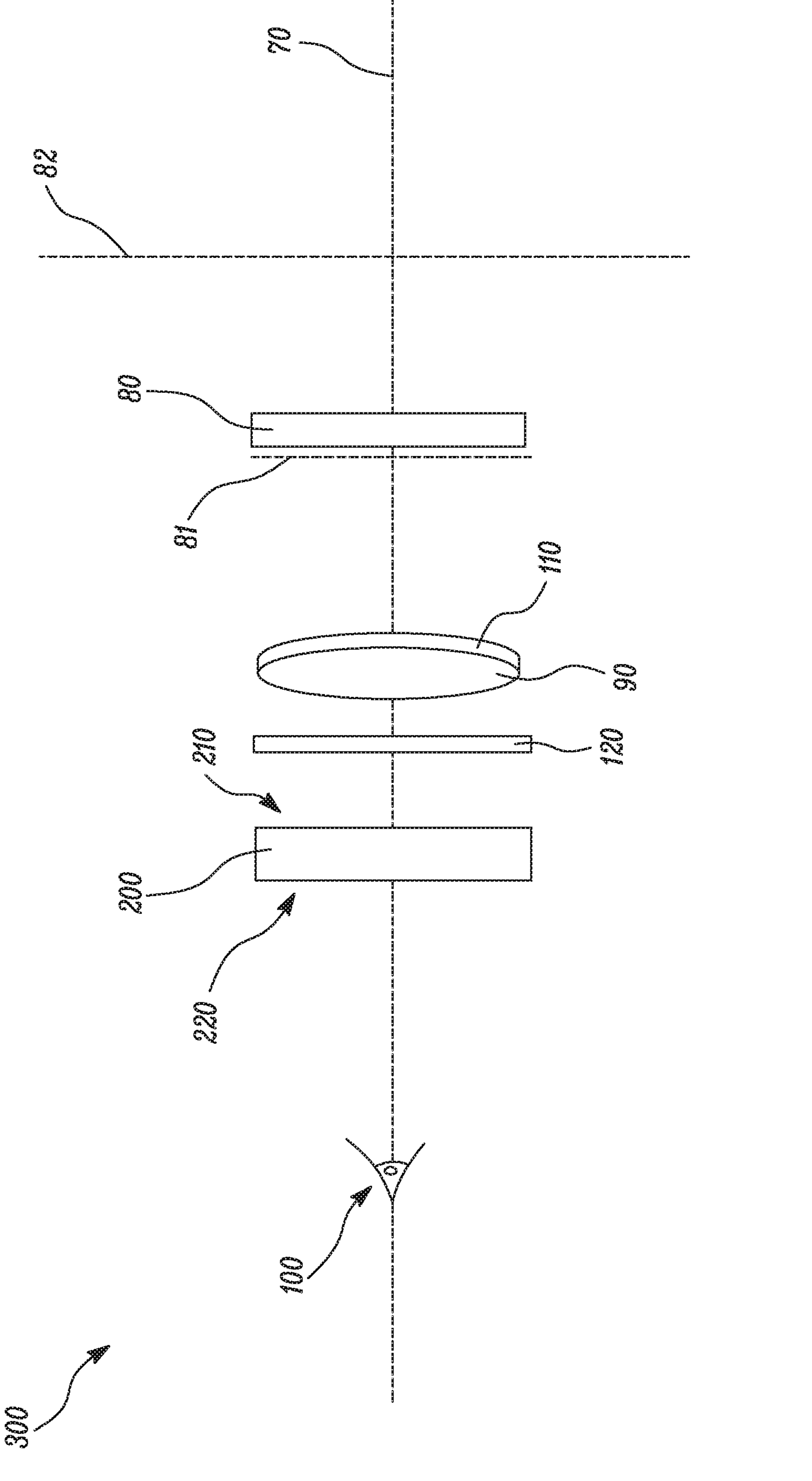
FIG. 6A is a schematic view of an optical system including the optical film of FIG. 1, in accordance with an embodiment of the present disclosure.

FIG. 6A illustrates the optical system 300, in accordance with an embodiment of the present disclosure. The optical system 300 includes the optical system axis 70, the display 80, at least one lens 90, and the optical film 200. The optical system 300 forms a virtual image 82 of an image 81 emitted by the display 80 for viewing by the eye 100 of the viewer. In the illustrated embodiment of FIG. 6A, the optical system 300 further includes one or more of a partial reflector 110 and an optical retarder 120.

The display 80 may include various elements, such as light emitting diodes (LEDs), lenses, collimators, reflectors, and/or polarizers. In some embodiments, the display 80 may include an organic light emitting diode (OLED) display. In some other embodiments, the display 80 may include a liquid crystal display (LCD).

The partial reflector 110 may be any suitable partial reflector based on desired application attributes. In some embodiments, the partial reflector 110 may be constructed by coating a thin layer of a metal, such as silver or aluminium, on a transparent substrate. In some embodiments, the partial reflector 110 may be formed by depositing thin-film dielectric coatings onto a surface of a lens, or by depositing a combination of metallic and dielectric coatings on the surface of the lens. In some embodiments, the partial reflector 110 may be a second reflective polarizer which may be a multilayer polymeric reflective polarizer or a wire grid polarizer.

In some embodiments, the optical retarder 120 may be in the form of a plurality of films laminated together, such as an oriented polymer film. In some embodiments, the optical retarder 120 may be a polymer coating, such as a liquid crystal polymer coating.

As shown in FIG. 6A, the first optical stack side 210 of the optical film 200 faces the display 80 and the light absorbing second optical stack side 220 of the optical film 200 faces the eye 100 of the viewer.

In the illustrated embodiment of FIG. 6A, the at least one lens 90 is disposed between the display 80 and the optical film 200 substantially along the optical system axis 70 of the optical system 300. In some embodiments, the partial reflector 110 and the optical retarder 120 are also disposed between the display 80 and the optical film 200 along the optical system axis 70 of the optical system 300.

Figure 6B:
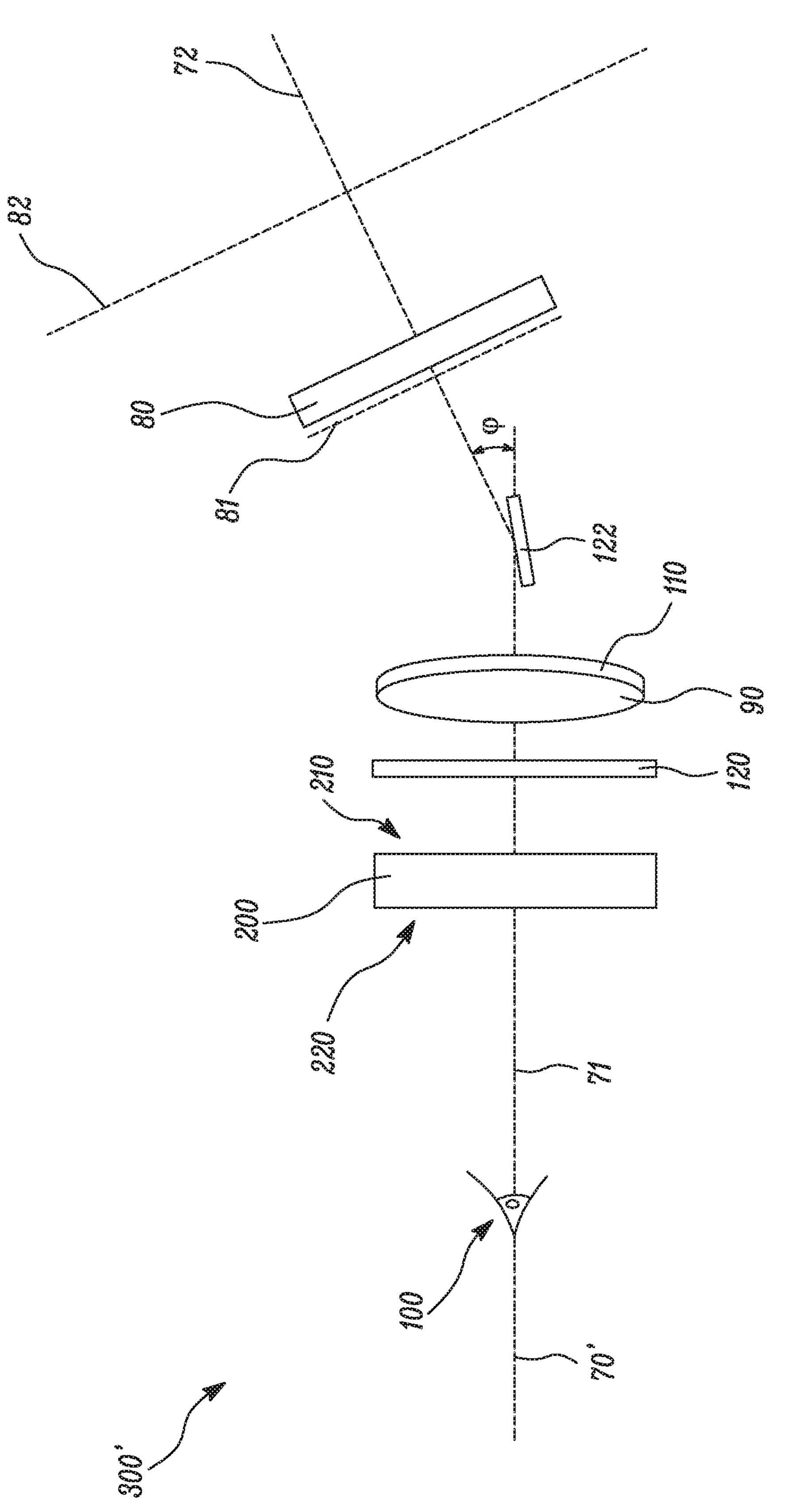
FIG. 6B is a schematic view of another optical system including the optical film of FIG. 1, in accordance with another embodiment of the present disclosure.

Referring to FIG. 6B, the optical system 300' is illustrated in accordance with another embodiment of the present disclosure. The optical system 300' may be substantially similar to the optical system 300 illustrated in FIG. 6A.

However, the optical system 300' includes the optical system axis 70'. The optical system axis 70' of the optical system 300' may include first and second segments 71, 72. In some embodiments, the optical film 200 may be located on the first segment 71 while the display 80 may be located on the second segment 72. In some embodiments, the optical system axis 70' is folded. In some embodiments, the optical system axis 70' is folded so that the first segment 71 of the optical system axis 70' substantially coincides with the different second segment 72 of the optical system axis 70'. In other words, the first and second segments 71, 72 are positioned such that an angle 9 is defined between the first and second segments 71, 72. In some embodiments, the angle 9 is from about −180 to about 180 degrees. In some cases, this may result in a compact optical system 300'.

The optical system 300' further includes an optical element 122 configured to optically couple the first and second segments 71, 72 such that light can travel between the first and second segments 71, 72. In some embodiments, the optical element 122 may be a reflecting element, such as a reflector or a partial reflector, which may be positioned such that a light from one of the first and second segments 71, 72, incident on the optical element 122, is substantially reflected toward the other of the first and second segments 71, 72. In some other embodiments, the optical element 122 may be a refracting element which may be positioned such that a light from one of the first and second segments 71, 72, incident on the optical element 122, is substantially refracted toward the other of the first and second segments 71, 72.

For each wavelength in the visible wavelength range 50 (shown in FIG. 2) and for both substantially normal incidence and oblique incidence (e.g., between about 25 degrees and about 60 degrees), the optical film 200 may substantially block the incident light 40 (shown in FIG. 1) by substantially reflecting the incident light 40 when the incident light 40 is s-polarized and incident from the first optical stack side 210 of the optical film 200. This may facilitate recycling of the incident light 40 from the display 80. In addition, for each wavelength in the visible wavelength range 50 and for both substantially normal incidence and oblique incidence (e.g., between about 25 degrees and about 60 degrees), the optical film 200 may substantially block the incident light 40 by substantially absorbing the incident light 40 when the incident light 40 is s-polarized and incident from the light absorbing second optical stack side 220 of the optical film 200. This may further ensure that less of the incident light 40 (e.g., ambient light) is reflected toward the eye 100 of the viewer. This may further prevent or substantially reduce optical artifacts, such as glare, from the optical film 200.

Moreover, for each wavelength in the visible wavelength range 50, the optical film 200 may substantially transmit the incident light 40 when the incident light is p-polarized and incident from each of the first and second optical stack sides 210, 220 of the optical film 200. The optical film 200 may therefore allow the p-polarized light from the display 80 to reach the eye 100, thereby allowing normal operation of the optical systems 300, 300'. Further, the optical film 200 may substantially reduce reflection of a p-polarized light incident from the second optical stack side 220, thereby substantially reducing reflection of the p-polarized light toward the eye 100 of the viewer. The p-polarized light incident from the second optical stack side 220 may be from external sources, for example, ambient light.

Figure 7:
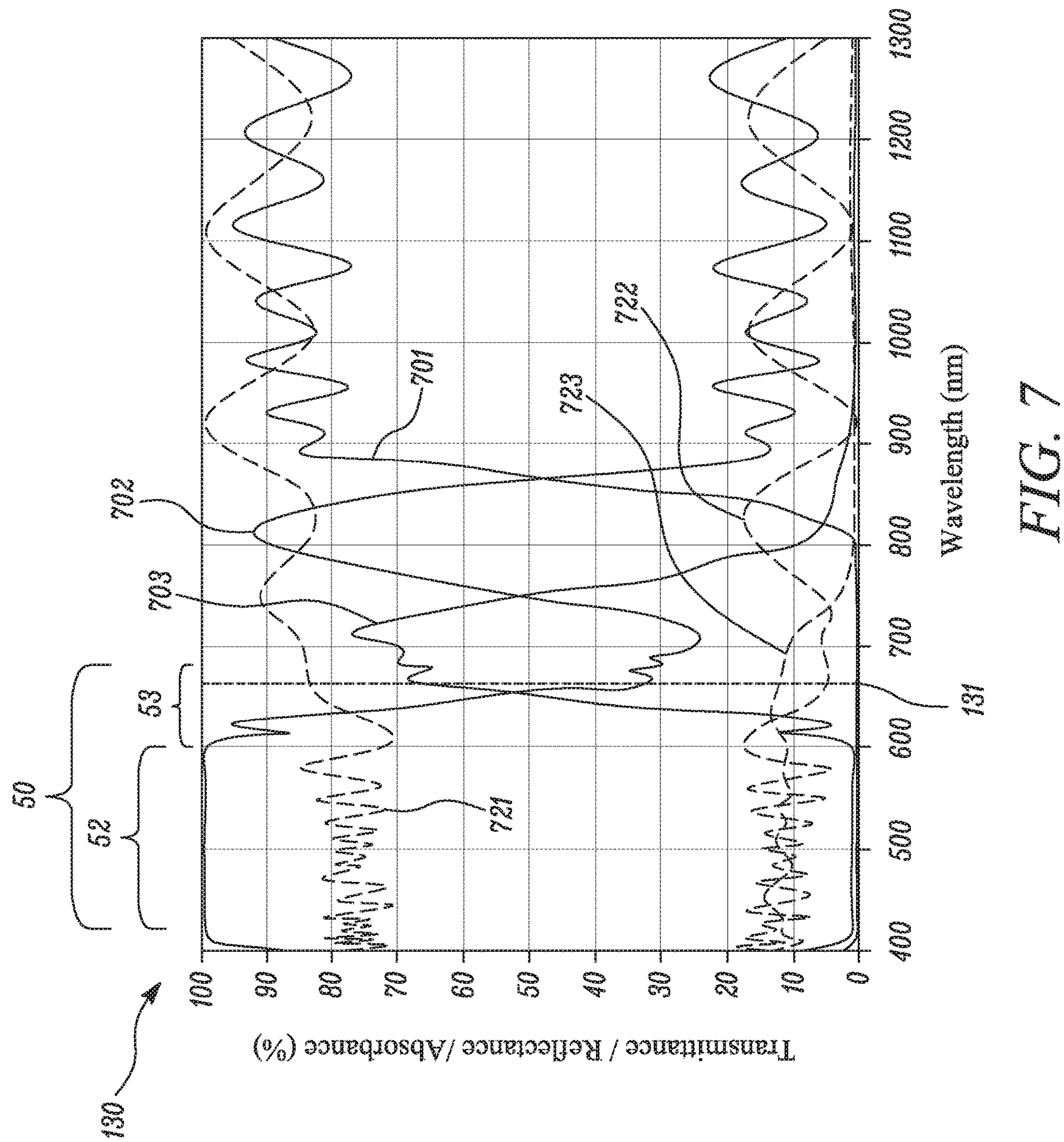
FIGS. 7 and 8 are graphs depicting optical characteristics of the optical film for normal incidence of an incident light, in accordance with another embodiment of the present disclosure.
Figure 8:
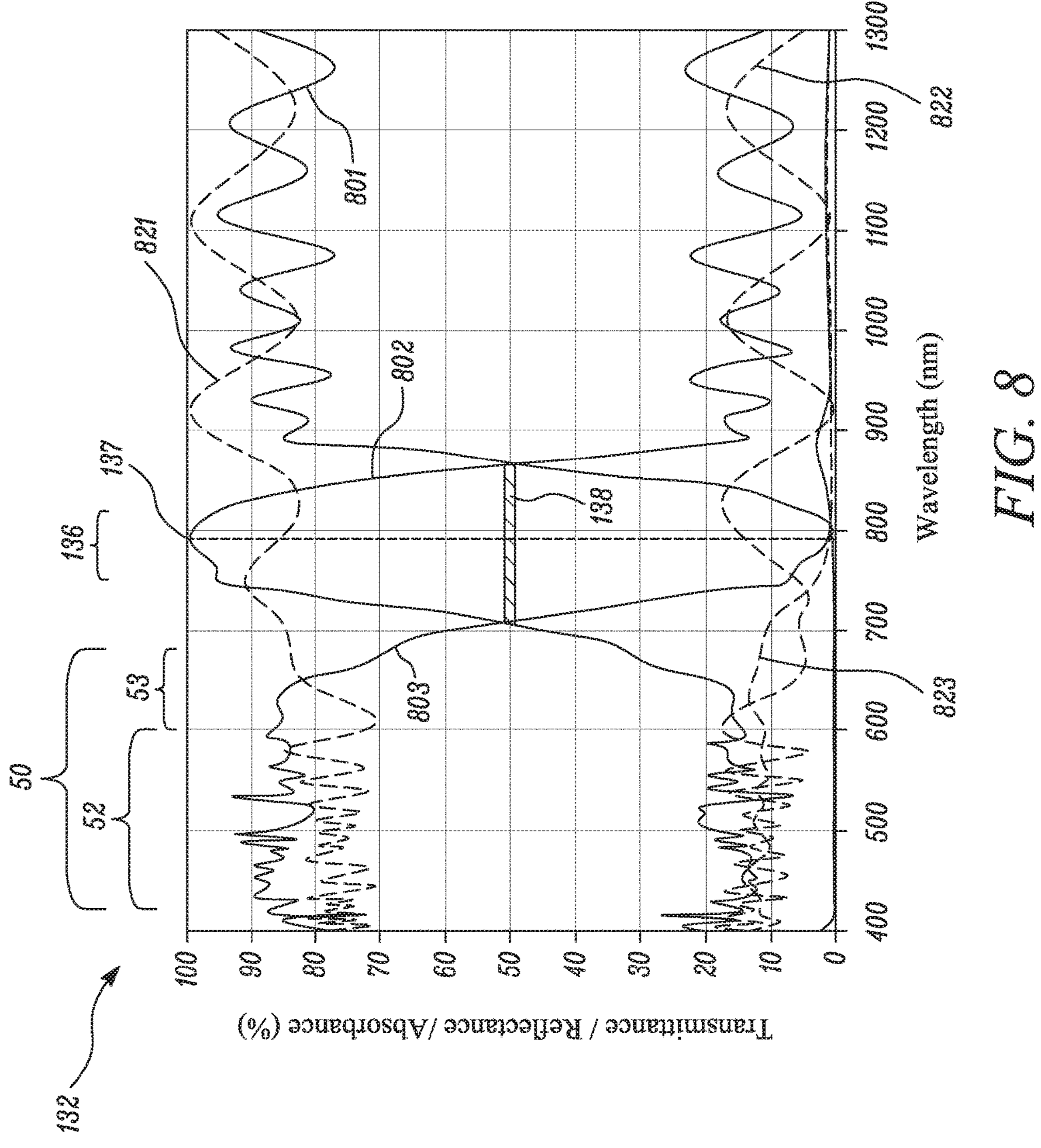

Referring to FIGS. 1, 7 and 8, graphs 130, 132 depict optical characteristics of the optical film 200 for the incident light 40 incident from the first optical stack side 210 and from the light absorbing second optical stack side 220, respectively, and for substantially normal incidence, according to another embodiment of the present disclosure. Specifically, the graphs 130, 132 depict optical transmittance, optical reflectance, and optical absorption of the optical film 200 for the incident light 40 incident from the first optical stack side 210 and from the light absorbing second optical stack side 220, respectively, and for substantially normal incidence. Wavelength is expressed in nanometers (nm) in the abscissa. Wavelength shown in the graphs 130, 132 include the visible wavelength range 50 and the infrared wavelength range. Further, the visible wavelength range 50 is divided into a shorter wavelength interval 52 at least 50 nm wide and a remaining longer wavelength interval 53 at least 40 nm wide. In some embodiments, the shorter wavelength interval 52 is at least 75 nm, at least 100 nm, or at least 150 nm wide. In some embodiments, the remaining longer wavelength interval 53 is at least 50 nm, at least 60 nm, or at least 70 nm wide. The optical transmittance, the optical reflectance, and the optical absorption are expressed as an optical transmittance percentage, an optical reflectance percentage, and an optical absorption percentage, respectively, in the left ordinate.

Referring now to FIGS. 1 and 7, the graph 130 illustrates the optical characteristics of the optical film 200 for the incident light 40 incident from the first optical stack side 210 and for substantially normal incidence. The graph 130 includes a transmittance curve 701, a reflectance curve 702 and an absorption curve 703 for the incident light 40 polarized along the first direction (i.e., s-polarized light) and incident from the first optical stack side 210, and for substantially normal incidence. The graph 130 further includes a transmittance curve 721, a reflectance curve 722 and an absorption curve 723 for the incident light 40 polarized along the second direction (i.e., p-polarized) and incident from the light absorbing second optical stack side 220, and for substantially normal incidence.

In other words, in some embodiments, for a s-polarized light substantially normally incident from the first optical stack side 210: the transmittance curve 701 represents optical transmittance versus wavelength of the optical film 200, the reflectance curve 702 represents optical reflectance versus wavelength of the optical film 200, and the absorption curve 703 represents optical absorption versus wavelength of the optical film 200.

Further, in some embodiments, for a p-polarized light substantially normally incident from the first optical stack side 210: the transmittance curve 721 represents optical transmittance versus wavelength of the optical film 200, the reflectance curve 722 represents optical reflectance versus wavelength of the optical film 200, and the absorption curve 723 represents optical absorption versus wavelength of the optical film 200.

As depicted by the reflectance curve 702, in some embodiments, for the substantially normally incident light 40, for each wavelength in the visible wavelength range 50 and divided into the shorter wavelength interval 52 and the remaining longer wavelength interval 53, for the incident light 40 incident from the first optical stack side 210 of the optical film 200, and for each wavelength in the shorter wavelength interval 52, the optical film 200 reflects more than about 60% of the incident light 40 when the incident light 40 is polarized along the first direction. In other words, for the substantially normally incident light 40, for each wavelength in the visible wavelength range 50 divided into the shorter wavelength interval 52 and the remaining longer wavelength interval 53, for the incident light 40 incident from the first optical stack side 210 of the optical film 200, and for each wavelength in the shorter wavelength interval 52, the optical film 200 reflects more than about 60% of the incident light 40 when the incident light 40 is s-polarized. In some embodiments, for the substantially normally incident light 40, for the incident light 40 incident from the first optical stack side 210 of the optical film 200, and for each wavelength in the shorter wavelength interval 52 of the visible wavelength range 50, the optical film 200 reflects more than about 70%, more than about 80%, or more than about 90% of the incident light 40 when the incident light 40 is polarized along the first direction.

As depicted by the absorption curve 703, in some embodiments, for the substantially normally incident light 40, for each wavelength in the visible wavelength range 50 divided into the shorter wavelength interval 52 and the remaining longer wavelength interval 53, for the incident light 40 incident from the first optical stack side 210 of the optical film 200, and for at least one wavelength 131 in the remaining longer wavelength interval 53, the optical film 200 absorbs more than about 40% of the incident light 40 when the incident light 40 is polarized along the first direction. In other words, for the substantially normally incident light 40, for each wavelength in the visible wavelength range 50 divided into the shorter wavelength interval 52 and the remaining longer wavelength interval 53, for the incident light 40 incident from the first optical stack side 210 of the optical film 200, and for the at least one wavelength 131 in the remaining longer wavelength interval 53, the optical film 200 absorbs more than about 40% of the incident light 40 when the incident light 40 is s-polarized. In some embodiments, for the substantially normally incident light 40, for the incident light 40 incident from the first optical stack side 210 of the optical film 200, and for the at least one wavelength 131 in the remaining longer wavelength interval 53 of the visible wavelength range 50, the optical film 200 absorbs more than about 45%, more than about 50%, more than about 55%, more than about 60%, or more than about 65% of the incident light 40 when the incident light 40 is polarized along the first direction.

Further, as depicted by the transmittance curve 701, in some embodiments, for the substantially normally incident light 40, for each wavelength in the visible wavelength range 50 divided into the shorter wavelength interval 52 and the remaining longer wavelength interval 53, and for the incident light 40 incident from the first optical stack side 210 of the optical film 200, the optical film 200 transmits less than about 30% of the incident light 40 when the incident light 40 is polarized along the first direction. In other words, for the substantially normally incident light 40, for each wavelength in the visible wavelength range 50 divided into the shorter wavelength interval 52 and the remaining longer wavelength interval 53, and for the incident light 40 incident from the first optical stack side 210 of the optical film 200, the optical film 200 transmits less than about 30% of the incident light 40 when the incident light 40 is s-polarized. In some embodiments, for the substantially normally incident light 40, for each wavelength in the visible wavelength range 50, and for the incident light 40 incident from the first optical stack side 210 of the optical film 200, the optical film 200 transmits less than about 15%, or less than about 10% of the incident light 40 when the incident light 40 is polarized along the first direction.

Therefore, as is apparent from the graph 130, for each wavelength in the shorter wavelength interval 52 of the visible wavelength range 50, the optical film 200 may be configured to substantially block the incident light 40 by substantially reflecting the incident light 40 when the incident light 40 is s-polarized and substantially normally incident from the first optical stack side 210. Further, for the at least one wavelength 131 in the remaining longer wavelength interval 53 of the visible wavelength range 50, the optical film 200 may be configured to substantially block the incident light 40 by substantially absorbing the incident light 40 when the incident light 40 is s-polarized and substantially normally incident from the first optical stack side 210.

As depicted by the transmittance curve 721, in some embodiments, for the substantially normally incident light 40, for each wavelength in the visible wavelength range 50 divided into the shorter wavelength interval 52 and the remaining longer wavelength interval 53, for the incident light 40 incident from the first optical stack side 210 of the optical film 200, and for each wavelength in the shorter wavelength interval 52, the optical film 200 transmits more than about 50% of the incident light 40 when the incident light 40 is polarized along the second direction. In other words, for the substantially normally incident light 40, for each wavelength in the visible wavelength range 50 divided into the shorter wavelength interval 52 and the remaining longer wavelength interval 53, for the incident light 40 incident from the first optical stack side 210 of the optical film 200, and for each wavelength in the shorter wavelength interval 52, the optical film 200 transmits more than about 50% of the incident light 40 when the incident light 40 is p-polarized. In some embodiments, for the substantially normally incident light 40, for the incident light 40 incident from the first optical stack side 210 of the optical film 200, and for each wavelength in the shorter wavelength interval 52 of the visible wavelength range 50, the optical film 200 transmits more than about 55%, more than about 60%, more than about 65%, or more than about 70% of the incident light 40 when the incident light 40 is polarized along the second direction.

As depicted by the absorption curve 723, in some embodiments, for the substantially normally incident light 40, for each wavelength in the visible wavelength range 50 divided into the shorter wavelength interval 52 and the remaining longer wavelength interval 53, for the incident light 40 incident from the first optical stack side 210 of the optical film 200, and for the at least one wavelength 131 in the remaining longer wavelength interval 53, the optical film 200 absorbs less than about 30% of the incident light 40 when the incident light 40 is polarized in the second direction. In other words, for the substantially normally incident light 40, for each wavelength in the visible wavelength range 50 divided into the shorter wavelength interval 52 and the remaining longer wavelength interval 53, for the incident light 40 incident from the first optical stack side 210 of the optical film 200, and for the at least one wavelength 131 in the remaining longer wavelength interval 53, the optical film 200 absorbs less than about 30% of the incident light 40 when the incident light 40 is p-polarized. In some embodiments, for the substantially normally incident light 40, for the incident light 40 incident from the first optical stack side 210 of the optical film 200, and for the at least one wavelength 131 in the remaining longer wavelength interval 53 of the visible wavelength range 50, the optical film 200 absorbs less than about 25%, less than about 20%, or less than about 15% of the incident light 40 when the incident light 40 is polarized along the second direction.

Further, as depicted by the reflection curve 722, in some embodiments, for the substantially normally incident light 40, for each wavelength in the visible wavelength range 50 divided into the shorter wavelength interval 52 and the remaining longer wavelength interval 53, and for the incident light 40 incident from the first optical stack side 210 of the optical film 200, the optical film 200 reflects less than about 40% of the incident light 40 when the incident light 40 is polarized along the second direction. In other words, for the substantially normally incident light 40, for each wavelength in the visible wavelength range 50 divided into the shorter wavelength interval 52 and the remaining longer wavelength interval 53, and for the incident light 40 incident from the first optical stack side 210 of the optical film 200, the optical film 200 reflects less than about 40% of the incident light 40 when the incident light 40 is p-polarized. In some embodiments, for the substantially normally incident light 40, for each wavelength in the visible wavelength range 50, and for the incident light 40 incident from the first optical stack side 210 of the optical film 200, the optical film 200 reflects less than about 35%, or less than about 30% of the incident light 40 when the incident light 40 is polarized along the second direction.

Therefore, for each wavelength in the visible wavelength range 50, the optical film 200 may be configured to substantially transmit the incident light 40, when the incident light 40 is p-polarized and substantially normally incident from the first optical stack side 210.

Referring now to FIGS. 1 and 8, the graph 132 illustrates the optical characteristics of the optical film 200 for the incident light 40 incident from the light absorbing second optical stack side 220, and for substantially normal incidence. The graph 132 includes a transmittance curve 801, a reflectance curve 802 (interchangeably referred to as "optical reflectance of the optical film versus wavelength 802") and an absorption curve 803 for the incident light 40 polarized along the first direction (i.e., s-polarized) and incident from the light absorbing second optical stack side 220, and for substantially normal incidence. The graph 132 further includes a transmittance curve 821, a reflectance curve 822 and an absorption curve 823 for the incident light 40 polarized along the second direction (i.e., p-polarized) and incident from the light absorbing second optical stack side 220, and for substantially normal incidence.

In other words, in some embodiments, for a s-polarized light substantially normally incident from the second optical stack side 220: the transmittance curve 801 represents optical transmittance versus wavelength of the optical film 200, the reflectance curve 802 represents optical reflectance versus wavelength of the optical film 200, and the absorption curve 803 represents optical absorption versus wavelength of the optical film 200.

Further, in some embodiments, for a p-polarized light substantially normally incident from the second optical stack side 220: the transmittance curve 821 represents optical transmittance versus wavelength of the optical film 200, the reflectance curve 822 represents optical reflectance versus wavelength of the optical film 200, and the absorption curve 823 represents optical absorption versus wavelength of the optical film 200.

As depicted by the reflectance curve 802, in some embodiments, for the substantially normally incident light 40, for the incident light 40 incident from the light absorbing second optical stack side 220 of the optical film 200, and for the visible wavelength range 50, the optical film 200 has an average optical reflectance of less than about 40% when the incident light 40 is polarized along the first direction. In other words, for the substantially normally incident light 40, for the incident light 40 incident from the light absorbing second optical stack side 220 of the optical film 200, and for the visible wavelength range 50, the optical film 200 has an average optical reflectance of less than about 40% when the incident light 40 is s-polarized. In some embodiments, for the substantially normally incident light 40, for the incident light 40 incident from the light absorbing second optical stack side 220 of the optical film 200, and for the visible wavelength range 50, the optical film 200 has an average optical reflectance of less than about 35%, less than about 30%, or less than about 25% when the incident light 40 is polarized along the first direction.

In some embodiments, for the incident light 40 being s-polarized, and for substantially normal incidence, the optical reflectance of the optical film versus wavelength 802 includes a reflection band 136 at least 50 nm wide and disposed between about 650 nm and 1000 nm. In some embodiments, the reflection band 136 is at least 75 nm wide, or at least 100 nm wide. Further, the reflection band 136 has a reflection peak 137 greater than about 70%. In other words, an optical reflectance of the optical film 200 at the reflection peak 137 is greater than about 70%. In some embodiments, the reflection peak 137 is greater than about 75%, greater than about 80%, greater than about 85%, or greater than about 90%. In some embodiments, the reflection band 136 includes a first FWHM 138. Therefore, the optical film 200 may be configured to substantially block the incident light 40 by substantially reflecting the incident light 40 when the incident light 40 is s-polarized and substantially normally incident from the light absorbing second optical stack side 220 for at least one wavelength in the reflection band 136. The at least one wavelength may be in the infrared wavelength range.

Further, as depicted by the transmittance curve 801, in some embodiments, for the substantially normally incident light 40, for the incident light 40 incident from the light absorbing second optical stack side 220 of the optical film 200, and for the visible wavelength range 50, the optical film 200 has an average optical transmittance of less than about 30% when the incident light 40 is polarized along the first direction.

In other words, for the substantially normally incident light 40, for the incident light 40 incident from the light absorbing second optical stack side 220 of the optical film 200, and for the visible wavelength range 50, the optical film 200 has an average optical transmittance of less than about 30% when the incident light 40 is s-polarized. In some embodiments, for the substantially normally incident light 40, for the incident light 40 incident from the light absorbing second optical stack side 220 of the optical film 200, and for the visible wavelength range 50, the optical film 200 has an average optical transmittance of less than about 25%, or less than about 20% when the incident light 40 is polarized along the first direction.

As depicted by the absorption curve 803, in some embodiments, for the substantially normally incident light 40, for the incident light 40 incident from the light absorbing second optical stack side 220 of the optical film 200, and for the visible wavelength range 50, the optical film 200 has an average optical absorbance of greater than about 60% when the incident light 40 is polarized along the first direction. In other words, for the substantially normally incident light 40, for the incident light 40 incident from the light absorbing second optical stack side 220 of the optical film 200, and for the visible wavelength range 50, the optical film 200 has an average optical absorbance of greater than about 60% when the incident light 40 is s-polarized. In some embodiments, for the substantially normally incident light 40, for the incident light 40 incident from the light absorbing second optical stack side 220 of the optical film 200, and for the visible wavelength range 50, the optical film 200 has an average optical absorbance of greater than about 65%, or greater than about 70% when the incident light 40 is polarized along the first direction.

Therefore, as is apparent from the graph 132, for each wavelength in the visible wavelength range 50, the optical film 200 may be configured to substantially block the incident light 40 by substantially absorbing the incident light 40 when the incident light 40 is s-polarized and substantially normally incident from the light absorbing second optical stack side 220. Further, for at least one wavelength in the reflection band 136, the optical film 200 may be configured to substantially block the incident light 40 by substantially reflecting the incident light 40 when the incident light 40 is s-polarized and substantially normally incident from the light absorbing second optical stack side 220. The at least one wavelength may be in the infrared wavelength range.

As depicted by the transmittance curve 821, in some embodiments, for the substantially normally incident light 40, for the incident light 40 incident from the light absorbing second optical stack side 220 of the optical film 200, and for the visible wavelength range 50, the optical film 200 has an average optical transmittance of more than about 50% when the incident light 40 is polarized along the second direction. In other words, for the substantially normally incident light 40, for the incident light 40 incident from the light absorbing second optical stack side 220 of the optical film 200, and for the visible wavelength range 50, the optical film 200 has an average optical transmittance of more than about 50% when the incident light 40 is p-polarized. In some embodiments, for the substantially normally incident light 40, for the incident light 40 incident from the light absorbing second optical stack side 220 of the optical film 200, and for the visible wavelength range 50, the optical film 200 has an average optical transmittance of more than about 55%, more than about 60%, more than about 65%, or more than about 70% when the incident light 40 is polarized along the second direction.

Further, as depicted by the reflectance curve 822, in some embodiments, for the substantially normally incident light 40, for the incident light 40 incident from the light absorbing second optical stack side 220 of the optical film 200, and for the visible wavelength range 50, the optical film 200 has an average optical reflectance of less than about 30% when the incident light 40 is polarized in the second direction. In other words, for the substantially normally incident light 40, for the incident light 40 incident from the light absorbing second optical stack side 220 of the optical film 200, and for the visible wavelength range 50, the optical film 200 has an average optical reflectance of less than about 30% when the incident light 40 is p-polarized. In some embodiments, for the substantially normally incident light 40, for the incident light 40 incident from the light absorbing second optical stack side 220 of the optical film 200, and for the visible wavelength range 50, the optical film 200 has an average optical reflectance of less about 25%, or less than about 20% when the incident light 40 is polarized along the second direction.

As depicted by the absorption curve 823, in some embodiments, for the substantially normally incident light 40, for the incident light 40 incident from the light absorbing second optical stack side 220 of the optical film 200, and for the visible wavelength range 50, the optical film 200 has an average optical absorbance of less than about 30% when the incident light 40 is polarized in the second direction. In other words, for the substantially normally incident light 40, for the incident light 40 incident from the light absorbing second optical stack side 220 of the optical film 200, and for the visible wavelength range 50, the optical film 200 has an average optical absorbance of less than about 30% when the incident light 40 is p-polarized. In some embodiments, for the substantially normally incident light 40, for the incident light 40 incident from the light absorbing second optical stack side 220 of the optical film 200, and for the visible wavelength range 50, the optical film 200 has an average optical absorbance of more less about 25%, or less than about 20% when the incident light 40 is polarized along the second direction.

Therefore, as is apparent from the graph 132, for each wavelength in the shorter visible wavelength interval of the visible wavelength range 50, the optical film 200 may be configured to substantially transmit the incident light 40, when the incident light 40 is p-polarized and substantially normally incident from the light absorbing second optical stack side 220.

Figure 9:
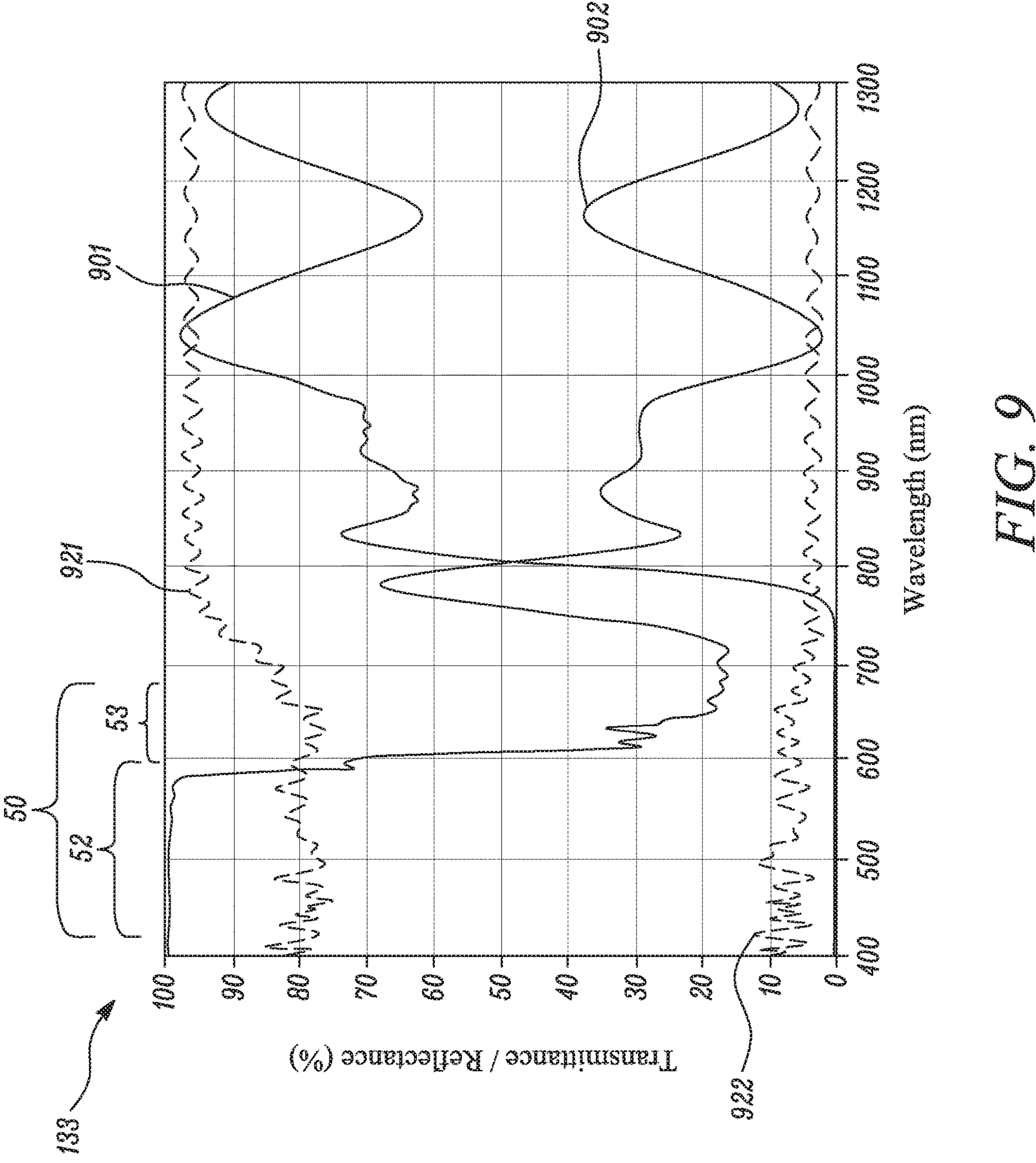
FIGS. 9 and 10 are graphs depicting optical characteristics of the optical film for oblique incidence of an incident light, in accordance with another embodiment of the present disclosure.
Figure 10:
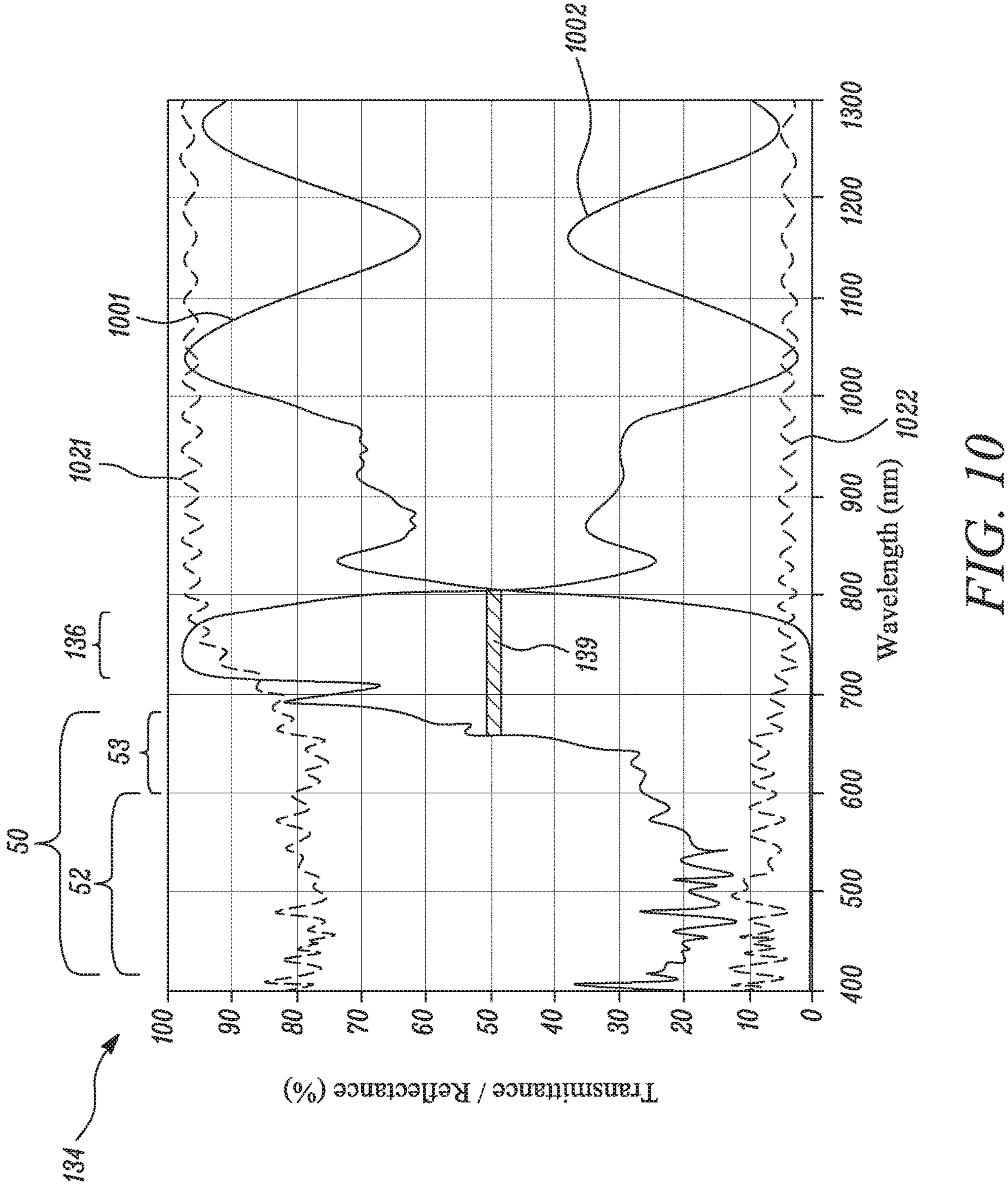

Referring to FIGS. 1, 9 and 10, graphs 133, 134 depict optical characteristics of the optical film 200 for the incident light 40 incident from the first optical stack side 210 and from the light absorbing second optical stack side 220, respectively, and for the incident angle θ of between about 25 and about 60 degrees, according to an embodiment of the present disclosure. In some embodiments, the incident angle θ is between about 30 degrees and about 50 degrees, or between about 35 degrees and about 45 degrees. In some embodiments, the graphs 133, 134 depict the optical characteristics of the optical film 200 for the incident light 40 incident from the first optical stack side 210 and from the light absorbing second optical stack side 220, respectively, and for the incident angle θ of about 40 degrees. Specifically, the graphs 133, 134 depict optical reflectance and optical transmittance of the optical film 200 for the incident light 40 incident from the first optical stack side 210 and from the light absorbing second optical stack side 220, respectively, and for the incident angle θ of about 40 degrees. Wavelength is expressed in nanometers (nm) in the abscissa. Wavelength shown in the graphs 133, 134 include the visible wavelength range 50 and the infrared wavelength range. Further, the visible wavelength range 50 is divided into the shorter wavelength interval 52 and the remaining longer wavelength interval 53. The optical transmittance and the optical reflectance are expressed as a transmittance percentage and a reflectance percentage, respectively, in the left ordinate.

Referring now to FIGS. 1 and 9, the graph 133 illustrates the optical characteristics of the optical film 200 for the incident light 40 incident from the first optical stack side 210 for the incident angle θ of between about 25 and about 60 degrees. The graph 133 includes a transmittance curve 901 and a reflectance curve 902 for the incident light 40 polarized along the first direction (i.e., s-polarized) and incident from the first optical stack side 210, and for the incident angle θ of between about 25 and about 60 degrees. The graph 133 further includes a transmittance curve 921 and a reflectance curve 922 for the incident light 40 polarized along the second direction (i.e., p-polarized) and incident from the first optical stack side 210, and for the incident angle θ of between about 25 and about 60 degrees.

In other words, in some embodiments, for a s-polarized light obliquely incident from the first optical stack side 210 at the incident angle θ of between about 25 and about 60 degrees: the transmittance curve 901 represents optical transmittance versus wavelength of the optical film 200, and the reflectance curve 902 represents optical reflectance versus wavelength of the optical film 200.

Further, in some embodiments, for a p-polarized light obliquely incident from the first optical stack side 210 at the incident angle θ of between about 25 and about 60 degrees: the transmittance curve 921 represents optical transmittance versus wavelength of the optical film 200, and the reflectance curve 922 represents optical reflectance versus wavelength of the optical film 200.

As depicted by the reflectance curve 902, in some embodiments, for each wavelength in the shorter wavelength interval 52, for the incident angle θ of between about 25 and about 60 degrees, and for the incident light 40 incident from the first optical stack side 210 of the optical film 200, the optical film 200 reflects more than about 60% of the incident light 40 when the incident light 40 is s-polarized. In other words, for each wavelength in the shorter wavelength interval 52, for the incident angle θ of between about 25 and about 60 degrees, and for the incident light 40 incident from the first optical stack side 210 of the optical film 200, the optical film 200 reflects more than about 60% of the incident light 40 when the incident light 40 is polarized along the first direction. In some embodiments, for each wavelength in the shorter wavelength interval 52, for the incident angle θ of between about 25 and about 60 degrees, and for the incident light 40 incident from the first optical stack side 210 of the optical film 200, the optical film 200 reflects more than about 65%, more than about 70%, more than about 75%, more than about 80%, or more than about 85% of the incident light 40 when the incident light 40 is s-polarized.

Further, as depicted by the transmittance curve 901, in some embodiments, for each wavelength in the shorter wavelength interval 52, for the incident angle θ of between about 25 and about 60 degrees, and for the incident light 40 incident from the first optical stack side 210 of the optical film 200, the optical film 200 transmits less than about 30% of the incident light 40 when the incident light 40 is s-polarized. In other words, for each wavelength in the shorter wavelength interval 52, for the incident angle θ of between about 25 and about 60 degrees, and for the incident light 40 incident from the first optical stack side 210 of the optical film 200, the optical film 200 transmits less than about 30% of the incident light 40 when the incident light 40 is polarized along the first direction. In some embodiments, for each wavelength in the shorter wavelength interval 52, for the incident angle θ of between about 25 and about 60 degrees, and for the incident light 40 incident from the first optical stack side 210 of the optical film 200, the optical film 200 transmits less than about 25%, or less than about 20% of the incident light 40 when the incident light 40 is s-polarized.

Therefore, as is apparent from the graph 133, for each wavelength in the shorter wavelength interval 52, the optical film 200 may be configured to substantially block the incident light 40 by substantially reflecting the incident light 40 when the incident light 40 is s-polarized and obliquely incident from the first optical stack side 210 at the incident angle θ of between about 25 and about 60 degrees.

As depicted by the transmittance curve 921, in some embodiments, for each wavelength in the shorter wavelength interval 52, for the incident angle θ of between about 25 and about 60 degrees, and for the incident light 40 incident from the first optical stack side 210 of the optical film 200, the optical film 200 transmits more than about 45% of the incident light 40 when the incident light 40 is p-polarized. In other words, for each wavelength in the shorter wavelength interval 52, for the incident angle θ of between about 25 and about 60 degrees, and for the incident light 40 incident from the first optical stack side 210 of the optical film 200, the optical film 200 transmits more than about 45% of the incident light 40 when the incident light 40 is polarized along the second direction. In some embodiments, for each wavelength in the shorter wavelength interval 52, for the incident angle θ of between about 25 and about 60 degrees, and for the incident light 40 incident from the first optical stack side 210 of the optical film 200, the optical film 200 transmits more than about 50%, more than about 55%, more than about 60%, more than about 65%, or more than about 70% of the incident light 40 when the incident light is p-polarized.

Further, as depicted by the reflectance curve 922, in some embodiments, for each wavelength in the shorter wavelength interval 52, for the incident angle θ of between about 25 and about 60 degrees, and for the incident light 40 incident from the first optical stack side 210 of the optical film 200, the optical film 200 reflects less than about 30% of the incident light 40 when the incident light 40 is p-polarized. In other words, for each wavelength in the shorter wavelength interval 52, for the incident angle θ of between about 25 and about 60 degrees, and for the incident light 40 incident from the first optical stack side 210 of the optical film 200, the optical film 200 reflects less than about 30% of the incident light 40 when the incident light 40 is polarized along the second direction. In some embodiments, for each wavelength in the shorter wavelength interval 52, for the incident angle θ of between about 25 and about 60 degrees, and for the incident light 40 incident from the first optical stack side 210 of the optical film 200, the optical film 200 reflects less than about 25%, or less than about 20% of the incident light 40 when the incident light is p-polarized.

Therefore, for each wavelength in the shorter wavelength interval 52, the optical film 200 may be configured to substantially transmit the incident light 40, when the incident light 40 is p-polarized and obliquely incident from the first optical stack side 210 at the incident angle θ of between about 25 and about 60 degrees.

Referring now to FIGS. 1 and 10, the graph 134 illustrates optical characteristics of the optical film 200 for the incident light 40 incident from the light absorbing second optical stack side 220 for the incident angle θ of between about 25 and about 60 degrees. The graph 134 includes a transmittance curve 1001 and a reflectance curve 1002 (interchangeably referred to as "optical reflectance of the optical film versus wavelength 1002") for the incident light 40 polarized along the first direction (i.e., s-polarized) and incident from the light absorbing second optical stack side 220, and for the incident angle θ of between about 25 and about 60 degrees. The graph 134 further includes a transmittance curve 1021 and a reflectance curve 1022 for the incident light 40 polarized along the second direction (i.e., p-polarized light) and incident from the light absorbing second optical stack side 220, and for the incident angle θ of between about 25 and about 60 degrees.

In other words, in some embodiments, for a s-polarized light obliquely incident from the second optical stack side 220 at the incident angle θ of between about 25 and about 60 degrees: the transmittance curve 1001 represents optical transmittance versus wavelength of the optical film 200, and the reflectance curve 1002 represents optical reflectance versus wavelength of the optical film 200.

Further, in some embodiments, for a p-polarized light obliquely incident from the second optical stack side 220 at the incident angle θ of between about 25 and about 60 degrees: the transmittance curve 1021 represents optical transmittance versus wavelength of the optical film 200, and the reflectance curve 1022 represents optical reflectance versus wavelength of the optical film 200.

As depicted by the reflectance curve 1002, in some embodiments, for each wavelength in the shorter wavelength interval 52, for the incident angle θ of between about 25 and about 60 degrees, and for the incident light 40 incident from the light absorbing second optical stack side 220 of the optical film 200, the optical film 200 reflects less than about 50% of the incident light 40 when the incident light 40 is s-polarized. In other words, for each wavelength in the shorter wavelength interval 52, for the incident angle θ of between about 25 and about 60 degrees, and for the incident light 40 incident from the light absorbing second optical stack side 220 of the optical film 200, the optical film 200 reflects less than about 50% of the incident light 40 when the incident light 40 is polarized along the first direction. In some embodiments, for each wavelength in the shorter wavelength interval 52, for the incident angle θ of between about 25 and about 60 degrees, and for the incident light 40 incident from the light absorbing second optical stack side 220 of the optical film 200, the optical film 200 reflects less than about 45%, less than about 40%, less than about 35%, or less than about 30% of the incident light 40 when the incident light 40 is s-polarized.

As depicted by the reflectance curve 1002, in some embodiments, for the incident light 40 being s-polarized and for the incident angle θ of between about 25 and about 60 degrees, the optical reflectance of the optical film versus wavelength 1002 includes the reflection band 136 having the reflection peak 137 (shown in FIG. 8). However, for the incident light 40 being s-polarized and for the incident angle θ of between about 25 and about 60 degrees, the optical reflectance of the optical film versus wavelength 1002 includes a second FWHM 139 different from the first FWHM 138 shown in FIG. 8.

As is apparent from the graphs 132, 134, shown in FIGS. 8 and 10, respectively, in some embodiments, increasing the incident angle θ by between about 25 and about 60 degrees, the first FWHM 138 of the reflection band 136 decreases to the second FWHM 139.

Further, as depicted by the transmittance curve 1001, in some embodiments, for each wavelength in the shorter wavelength interval 52, for the incident angle θ of between about 25 and about 60 degrees, and for the incident light 40 incident from the light absorbing second optical stack side 220 of the optical film 200, the optical film 200 transmits less than about 30% of the incident light 40 when the incident light 40 is s-polarized. In other words, for each wavelength in the shorter wavelength interval 52, for the incident angle θ of between about 25 and about 60 degrees, and for the incident light 40 incident from the light absorbing second optical stack side 220 of the optical film 200, the optical film 200 transmits less than about 30% of the incident light 40 when the incident light 40 is polarized along the first direction. In some embodiments, for each wavelength in the shorter wavelength interval 52, for the incident angle θ of between about 25 and about 60 degrees, and for the incident light 40 incident from the light absorbing second optical stack side 220 of the optical film 200, the optical film 200 transmits less than about 25%, or less than about 20% of the incident light 40 when the incident light 40 is s-polarized.

Since both an average optical transmittance and an average optical reflectance of the optical film 200 corresponding to the respective transmittance and reflectance curves 1001, 1002 are substantially low (e.g., less than about 30% or about 40%) in the shorter wavelength interval 52, the optical film 200 may substantially block the incident light 40, for each wavelength in the shorter wavelength interval 52, by substantially absorbing the incident light 40 when the incident light 40 is s-polarized and obliquely incident from the light absorbing second optical stack side 220 at the incident angle θ of between about 25 and about 60 degrees.

As depicted by the transmittance curve 1021, in some embodiments, for each wavelength in the shorter wavelength interval 52, for the incident angle θ of between about 25 and about 60 degrees, and for the incident light 40 incident from the light absorbing second optical stack side 220 of the optical film 200, the optical film 200 transmits more than about 50% of the incident light 40 when the incident light 40 is p-polarized. In other words, for each wavelength in the shorter wavelength interval 52, for the incident angle θ of between about 25 and about 60 degrees, and for the incident light 40 incident from the light absorbing second optical stack side 220 of the optical film 200, the optical film 200 transmits more than about 50% of the incident light 40 when the incident light 40 is polarized along the second direction. In some embodiments, for each wavelength in the shorter wavelength interval 52, for the incident angle θ of between about 25 and about 60 degrees, and for the incident light 40 incident from the light absorbing second optical stack side 220 of the optical film 200, the optical film 200 transmits more than about 60%, more than about 70%, or more than about 80% of the incident light 40 when the incident light 40 is p-polarized.

Further, as depicted by the reflectance curve 1022, in some embodiments, for each wavelength in the shorter wavelength interval 52, for the incident angle θ of between about 25 and about 60 degrees, and for the incident light 40 incident from the light absorbing second optical stack side 220 of the optical film 200, the optical film 200 reflects less than about 30% of the incident light 40 when the incident light 40 is p-polarized. In other words, for each wavelength in the shorter wavelength interval 52, for the incident angle θ of between about 25 and about 60 degrees, and for the incident light 40 incident from the light absorbing second optical stack side 220 of the optical film 200, the optical film 200 reflects less than about 30% of the incident light 40 when the incident light 40 is polarized along the second direction. In some embodiments, for each wavelength in the shorter wavelength interval 52, for the incident angle θ of between about 25 and about 60 degrees, and for the incident light 40 incident from the light absorbing second optical stack side 220 of the optical film 200, the optical film 200 reflects less than about 25%, or less than about 20% of the incident light 40 when the incident light 40 is p-polarized.

Therefore, as is apparent from the graph 134, for each wavelength in the shorter wavelength interval 52, the optical film 200 may be configured to substantially transmit the incident light 40, when the incident light 40 is p-polarized and obliquely incident from the light absorbing second optical stack side 220 at the incident angle θ of between about 25 and about 60 degrees.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilising the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An optical film comprising a first optical stack disposed on, and spaced apart by one or more spacer layers from, a visible light absorbing second optical stack, each of the first and second optical stacks comprising a plurality of polymeric layers, each of the polymeric layers having an average thickness of less than about 500 nm, such that for an incident light propagating in an incident plane comprising a second direction, for each wavelength in a visible wavelength range extending from about 420 nm to about 680 nm, and for substantially normal incidence:

for the incident light incident from a first optical stack side of the optical film: the optical film reflects more than about 60% of the incident light when the incident light is s-polarized and transmits more than about 45% of the incident light when the incident light is p-polarized; and for the incident light incident from a light absorbing second optical stack side of the optical film: the optical film reflects less than about 30% of the incident light when the incident light is s-polarized and transmits more than about 50% of the incident light when the incident light is p-polarized.

2. The optical film of claim 1, wherein for the incident light propagating in the incident plane P comprising the second direction, for each wavelength in a visible wavelength range extending from about 420 nm to about 680 nm, and for an incident angle of between about 25 and 60 degrees:

for the incident light incident from the first optical stack side of the optical film: the optical film reflects more than about 60% of the incident light when the incident light is s-polarized and transmits more than about 45% of the incident light when the incident light is p-polarized; and for the incident light incident from the light absorbing second optical stack side of the optical film: the optical film reflects less than about 40% of the incident light when the incident light is s-polarized and transmits more than about 50% of the incident light when the incident light is p-polarized.

3. The optical film of claim 1, wherein for the incident light propagating in the incident plane P comprising the second direction, for the incident light being s-polarized, and for substantially normal incidence, an optical reflectance of the optical film versus wavelength comprises a reflection band at least 100 nm wide and disposed between about 650 nm and about 1200 nm, the reflection band having a reflection peak greater than about 70%, wherein the reflection band has a first full width at half maximum (FWHM) and when increasing the incident angle by between about 25 and 60 degrees, the FWHM of the reflection band decreases to a second FWHM.

4. An optical system comprising a folded optical system axis so that a first segment of the optical system axis substantially coincides with a different second segment of the optical system axis, a display at least one lens, and the optical film of claim 1, the optical system forming a virtual image of an image emitted by the display for viewing by an eye, wherein the first optical stack side of the optical film faces the display, and the light absorbing second optical stack side of the optical film faces the eye.

* * * * *